US012124617B2

(12) United States Patent
Hsu et al.

(10) Patent No.: US 12,124,617 B2
(45) Date of Patent: Oct. 22, 2024

(54) SECURING A CONTAINER ECOSYSTEM

(71) Applicant: Hewlett Packard Enterprise Development LP, Spring, TX (US)

(72) Inventors: Wan-Yen Hsu, Cupertino, CA (US); Chih-Hao Chang, Taipei (TW); Lin-Chan Hsiao, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 206 days.

(21) Appl. No.: 17/930,333

(22) Filed: Sep. 7, 2022

(65) Prior Publication Data

US 2024/0078342 A1 Mar. 7, 2024

Related U.S. Application Data

(63) Continuation of application No. 17/929,814, filed on Sep. 6, 2022.

(51) Int. Cl.
*G06F 21/00* (2013.01)
*G06F 9/50* (2006.01)
*G06F 21/12* (2013.01)
*G06F 21/64* (2013.01)
*G06F 21/71* (2013.01)
*H04L 9/08* (2006.01)
*H04L 9/32* (2006.01)

(52) U.S. Cl.
CPC ............ *G06F 21/64* (2013.01); *G06F 9/5072* (2013.01); *G06F 21/121* (2013.01); *G06F 21/71* (2013.01); *H04L 9/0825* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 8,196,213 B2 | 6/2012 | Klucher et al. | |
| 8,656,453 B2 | 2/2014 | Punnoose et al. | |
| 8,950,007 B1 | 2/2015 | Teal et al. | |
| 9,811,806 B1 | 11/2017 | Kuang et al. | |
| 10,650,157 B2 * | 5/2020 | Schultz | G06F 21/6218 |

(Continued)

OTHER PUBLICATIONS

Aurora. P., "Full stack security that automatically detects threats in seconds and minimizes risk", retrieved from: https://www.hpe.com/us/en/security/project-aurora.html, retrieved on: Spetember 30, 2022, pp. 14.

(Continued)

*Primary Examiner* — Andrew J Steinle
(74) *Attorney, Agent, or Firm* — Hewlett Packard Enterprise Patent Department

(57) ABSTRACT

Examples described herein relate to a security management system to secure a container ecosystem. In some examples, the security management system may protect one or more entities such as container management applications, container images, containers, and/or executable applications within the containers. The security management system may make use of digital cryptography to generate digital signatures corresponding to one or more of these entities and verify them during the execution so that any compromised entities can be blocked from execution and the container ecosystem may be safeguarded from any malicious network attacks.

15 Claims, 12 Drawing Sheets

(56) References Cited

U.S. PATENT DOCUMENTS

| | | |
|---|---|---|
| 2006/0037000 A1 | 2/2006 | Speeter et al. |
| 2006/0149408 A1 | 7/2006 | Speeter et al. |
| 2009/0327741 A1 | 12/2009 | Zimmer et al. |
| 2016/0275287 A1 | 9/2016 | Wiest et al. |
| 2017/0116412 A1 | 4/2017 | Stopel et al. |
| 2017/0177877 A1 | 6/2017 | Suarez et al. |
| 2018/0129479 A1 | 5/2018 | McPherson et al. |
| 2018/0375728 A1 | 12/2018 | Gangil et al. |
| 2019/0042759 A1 | 2/2019 | Smith et al. |
| 2019/0364492 A1* | 11/2019 | Azizi ................ H04W 4/44 |
| 2020/0012818 A1 | 1/2020 | Levin et al. |
| 2021/0075626 A1 | 3/2021 | Ilany et al. |
| 2021/0103651 A1 | 4/2021 | Kapustein et al. |
| 2021/0303722 A1 | 9/2021 | Donohoe |
| 2021/0326333 A1 | 10/2021 | Qi et al. |
| 2021/0334358 A1 | 10/2021 | Medvinsky et al. |
| 2022/0164214 A1 | 5/2022 | Yu et al. |
| 2022/0171856 A1 | 6/2022 | Bhatt et al. |
| 2023/0208828 A1 | 6/2023 | Kolodziej |
| 2023/0247002 A1 | 8/2023 | Nyamwange |

OTHER PUBLICATIONS

Cosign, Retrieved from: https://github.com/sigstore/cosign, retrieved on: Sep. 30, 2022, pp. 21.

Falco, "The Falco Project", retrieved from: https://falco.org/, retrieved on: Sep. 30, 2022, pp. 4.

Shankar, P., "Detecting exploits of CVE-2019-5736: runc container breakout", Feb. 11, 2019, retrieved from: https://sysdig.com/blog/cve-2019-5736-runc-container-breakout/#:~:text=What%20is%20CVE%2D2019%2D5736,execution%20and%20underlying%20file%20access., pp. 9.

* cited by examiner

SECURING A CONTAINER ECOSYSTEM

CROSS-REFERENCE TO RELATED APPLICATIONS

This application is a continuation of U.S. patent application Ser. No. 17/929,814, filed on 6 Sep. 2022, the entire contents of which are incorporated by reference herein. Applicant hereby rescinds any disclaimer of claim scope in the parent applications or the prosecution history thereof and advises the USPTO that the claims in this application may be broader than any claim in the parent applications.

BACKGROUND

Containers are virtual computing instances that bundle useful elements such as resource allocations (e.g., compute, storage, etc.), data and instructions-into a single executable unit to run an application in any appropriate computing environment. Container management applications facilitate the creation, deployment, and management of container images and/or containers. The container images may be stored on container image repositories and can be used to create the containers using the container management applications such as container runtimes.

The container management applications, the container image repositories, and/or the containers as described hereinabove may be deployed on host platforms (e.g., host systems) in host network infrastructures ranging from personal/home networks, private cloud, public cloud, and personal or shared data centers. As will be understood, these host platforms and host network infrastructures may or may not be sufficiently protected allowing an attacker or an intruder to hack and corrupt the container management application, a newly built container image, the container image repository, and/or the container images stored in the container image repository. In certain instances, even the container runtimes could be hacked and the attacker could also alter the executables inside the containers. In certain instances such malicious attacks can cause a massive service outage for customers running applications via these containers.

BRIEF DESCRIPTION OF THE DRAWINGS

Features, aspects, and advantages of the present specification will become better understood when the following detailed description is read with reference to the accompanying drawings in which like characters represent like parts throughout the drawings.

Figure 1:
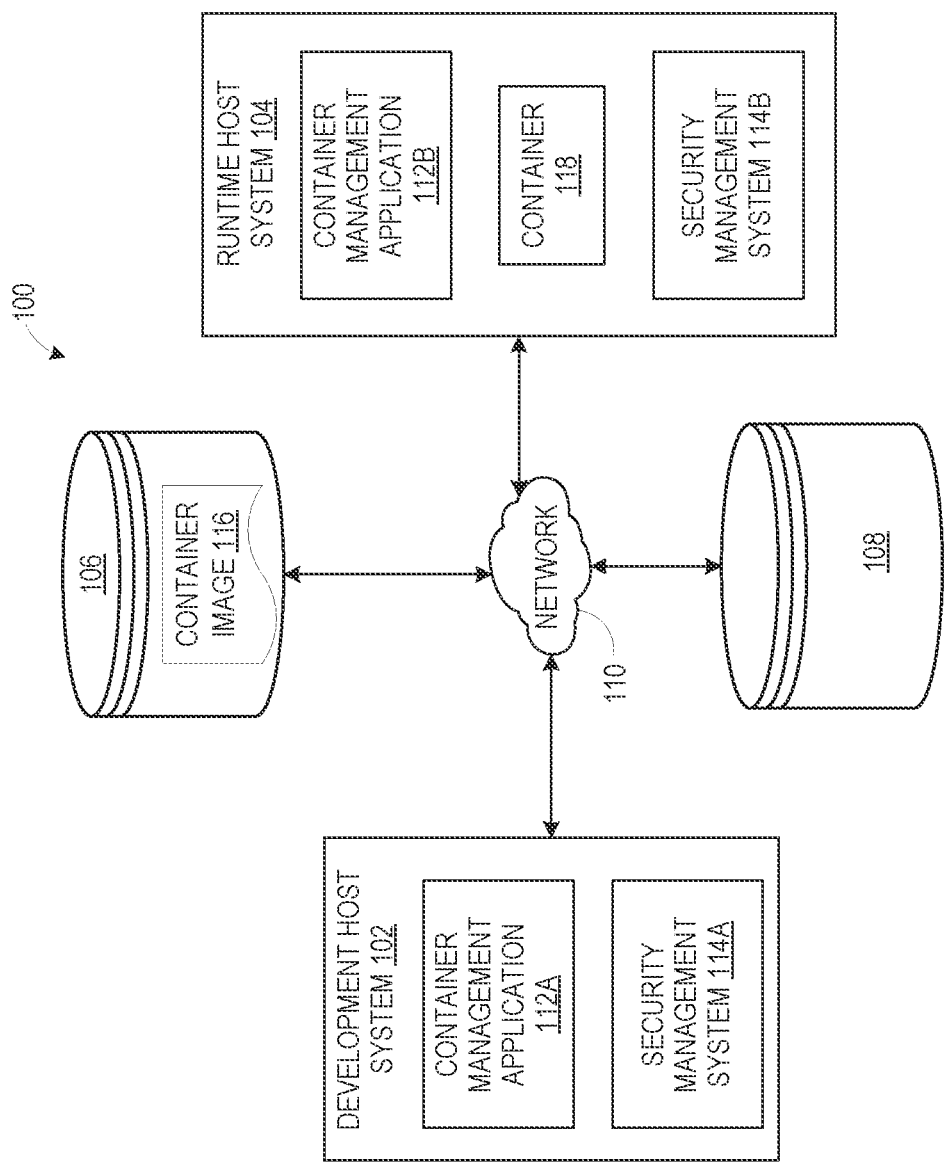
FIG. 1 depicts a container ecosystem in which various of the examples presented herein may be implemented.

It is emphasized that, in the drawings, various features are not drawn to scale. In fact, in the drawings, the dimensions of the various features have been arbitrarily increased or reduced for clarity of discussion.

DETAILED DESCRIPTION

Containers have become a popular choice for implementing small-scale or large-scale cloud-native applications because of their high modularity and scalability. Containers have been extensively used in today's cloud-based and distributed IT infrastructures to host applications. Containers isolate software and allow it to work independently across different operating systems, hardware, networks, and storage systems. For example, as one unit, a container can easily be moved and run on any operating system with any platform ranging from a personal computer to a large or small-scale cloud environment (e.g., public or private cloud). The container allows the container-based application to transition seamlessly through development, testing, and production environments. Because an operating system is not packed into the container, each container uses minimal computing resources, making it light and easy to install, and offers an efficient way for developers to deploy them in clusters, with individual containers holding individual components of complex applications.

Containers are managed by container management applications which include container image building tools (e.g., Docker, Podman, Buildah), container runtimes (e.g., RunC, Containerd, Docker, or Windows Containers), and container orchestration tools (e.g., Kubernetes, Docker Swarm, and Apache Mesas). In particular, as used herein, the term container management application refers to any application that performs creating a container image, creating a container from the container image, managing lifecycle actions of the container, scheduling the container, and/or migrating the container. A container image is a lightweight, standalone, executable package of software that includes everything needed to run an application. The lifecycle actions may include initialization of the container created using the container image, a resume of the container, an update of the container, or combinations thereof. If the container management applications, the container image repositories storing the container images, and/or the containers themselves are hosted on inadequately protected or non-secured host platforms and host network infrastructures, the container management applications, the container image repositories, and/or the containers are susceptible to security threats.

An attacker or an intruder may hack the container management application itself and modify it by injecting malicious data and/or code. In some instances, a newly built container image could be compromised before uploading to the container image repository. In some instances, the container image repository may be hacked and the container images hosted on the container image repository may be compromised. In certain other instances, a genuine (i.e., uncompromised) container image downloaded from the container image repository could be injected with malicious contents before executing by a container runtime. In some cases, even the container runtimes could be hacked. Furthermore, even during the execution of the container, the attackers could alter the executables inside the container. The above-mentioned threats may result in executing malicious container workloads. In some cases, it may even be possible that the attackers escalate the privilege and hijack the host platforms via container breakout. In certain implementations, even an entire cluster of host platforms may be impacted leading to a massive service outage for customers.

Certain existing solutions aim to protect the distribution of container images. The protection technique of certain existing solutions involves securing container images that are uploaded to a container image repository by creating the container image manifest's signature and using this signature to verify the container image before downloading it from the container image repository. However, the referenced existing solutions cannot secure the containers deployed based on the container image nor can secure the container image between a duration when the container image was created and loaded into the container image repository. Some existing solutions entail reporting unexpected processes running in the container, however, fail to check the integrity of a container image and the container itself and also fail to prevent the security threats from running.

To secure the container ecosystem, it may not be enough to detect and report the incidents as there is a time window for a tampered container workload to execute and cause damage before operators shut down the host platform running any compromised container.

In accordance with some examples consistent with the present disclosure, a security management system is presented that addresses one or more of the problems described hereinabove. In particular, the proposed security management system is configured to secure several entities in a container ecosystem thereby blocking the execution of any compromised container management applications, container images, containers, and/or executable applications within the containers from further execution.

For example, the security management system may secure a container management application to ensure that a compromised container management application is blocked from execution thereby protecting the host system from creating and executing any malicious containers. This is achieved, at least in part, as the security management system may periodically or on request looks for any container management applications hosted on a given host platform (also referred to as a host system). Upon discovering the container management application on the host system, the security management system may generate a container management application digital signature (CMADS) based on the container management application. The CMADS may be a signed cryptographic hash of the container management application, in some examples.

During the operation of the host system, the security management system monitors any attempt to run the container management application and verifies the container management application using the CMADS upon detecting the attempt to run the container management application. The security management system may allow the container management application to execute if the container management application is successfully verified using the CMADS. If the container management application is found as compromised (i.e., if the verification of the container management application fails), the security management system blocks the execution of the container management application. Additionally, in some examples, the security management system may enable immutability for the container management application. Upon activation of the immutability, the security management system may block any modification to the container management application. Accordingly, the security management system may not only detect and block the execution of the compromised container management application but also prevents modifications to the container management application if the immutability is enabled.

In some examples, the security management system secures container images to ensure that the use of compromised container images is blocked. A container image typically includes a plurality of instruction layers, where each of the plurality of instruction layers includes a set of objects (e.g., commands, files, executable applications, data, etc.). To protect the container image, the security management system iterates through the instruction layers of the container image and generates instruction layer digital signatures corresponding to the plurality of instruction layers based on respective sets of objects. In particular, for each instruction layer, the security management system calculates a first-level cryptographic hash of the objects and a second-level cryptographic hash based on the first-level cryptographic hash. The management system may then sign the second-level cryptographic hash to generate the instruction layer digital signature (ILDS) for the respective instruction layer. Once an ILDS is generated for each of the instruction layers of the container image, the security management system may upload the container image to a container image repository. Further, the security management system may store the ILDSs of the container image along with a container image identifier in the signature repository.

When the container image is downloaded by a user on a host system to create one or more containers, the security management system hosted on the host system may trigger verification of the container image to ensure that the container image is not tampered with. The security management system may verify the container image using the ILDSs stored in the signature repository. As will be appreciated, the verification of the container images using the ILDSs not only aids in establishing the authenticity of the container image but also aids in determining the identity of the instruction layer that is compromised. Also, since the container images are uploaded after the ILDSs are generated, any tampering with the container images in the duration between the ILDSs being generated and the container images are uploaded to the container image repository can also be detected, and the use of such tampered container images may be blocked.

In certain examples, the security management system secures executable applications to ensure that a container including any compromised executable application is blocked from further execution. In particular, the executable applications may be verified while a container (that is created using the container image referencing the executable applications) is running. An objective of verifying the executable applications in addition to the container images (described above) is to effectively detect and block tampered applications from execution as there are chances that the executable applications may get tampered with during the execution of the containers. In some examples, to enable such security, the security management system may generate an executable application digital signature (EAPPDS) based on a cryptographic hash of the executable application referenced in an instruction layer of the container image. In some examples, the EAPPDS may be stored in a signature repository and may be transmitted to the container management application to verify the executable application during the execution of the container created using the container image.

The term "digital signature" or its specific example variations such as the CMADS, ILDS, EAPPDS, as used herein may refer to a digital code of a predefined length of a string of characters (including, alphabets, numbers, symbols, and/or special characters. These digital signatures may be created by applying any suitable predefined function (for example, a mathematical/cryptographical algorithm) to a respective source data.

As will be appreciated, the example proposed solution implemented via the security management system provides multi-layer security for container technology and overcomes several of the problems encountered in the state of the art. As described hereinabove, in some examples, the proposed solution aids in blocking compromised container management applications. In some examples, the container management applications may even be blocked from any modification. Further, in some examples, container images may be protected at the level of instruction layers. Not only the compromised container images are blocked from use but also tampered instruction layers may be identified. This may help in easier and faster debugging of the compromised container images. Further, in some examples, the proposed solution minimizes the chances of compromised executable applications running during the execution of the containers thereby securing the host platforms from and preventing a larger impact on the cluster of host platforms to reduce the impact on customer workloads.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1A illustrates a container ecosystem 100 in which various of the examples presented herein may be implemented. The container ecosystem 100 may be a networked system that may include one or more of a development host system 102, a runtime host system 104, a container image repository 106, and a signature repository 108 coupled to each other via a network 110. In the example implementation of FIG. 1, single instances of the development host system 102, the runtime host system 104, the container image repository 106, and the signature repository 108 are shown for ease of illustration. In some examples, the container ecosystem 100 may include more than one instance of one or more of the development host system 102, the runtime host system 104, the container image repository 106, and the signature repository 108. In one example implementation, the container ecosystem 100 may include a plurality of runtime host systems configured to be operated as a cluster.

In some examples, the container ecosystem 100 may be a distributed system where one or more of the development host system 102, the runtime host system 104, the container image repository 106, and the signature repository 108 are located at physically different locations (e.g., on different racks, on different enclosures, in different buildings, in different cities, in different countries, and the like) while being connected via the network 110. In certain other examples, the container ecosystem 100 may be a turnkey solution or an integrated product. In some examples, the terms "turnkey solution" or "integrated product" may refer to a ready-for-use packaged solution or product where the development host system 102, the runtime host system 104, the container image repository 106, and the signature repository 108, and the network 110 are all disposed within a common enclosure or a common rack.

Further, in some examples, the container ecosystem 100 when implemented as an integrated product (e.g., a single computing system) that executes functions of one or more of the development host system 102, the runtime host system 104, the container image repository 106, and the signature repository 108; and the network 110 may be used connect the container ecosystem 100 any other external computing system (not shown). Furthermore, in some examples, the development host system 102 and the runtime host system 104 may be implemented as a single computing system. Moreover, in some examples, the container ecosystem 100 in any form, be it the distributed system, the turnkey solution, or the integrated product, may be capable of being reconfigured by adding or removing development host system instances, runtime host system instances, signature repository instances, and/or container image repository instances; and/or by adding or removing internal resources to such instances.

Examples of the network 110 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. In some examples, the network 110 may include one or more network switches, routers, or network gateways to facilitate data communication. Communication over the network 110 may be performed in accordance with various communication protocols such as but not limited to, Transmission Control Protocol and Internet Protocol (TCP/IP), User Datagram Protocol (UDP), IEEE 802.11, and/or cellular communication protocols. The communication over the network 110 may be enabled via wired (e.g., copper, optical communication, etc.) or wireless (e.g., Wi-Fie, cellular communication, satellite communication, Bluetooth, etc.) communication technologies. In some examples, the network 110 may be enabled via private communication links including, but not limited to, communication links established via Bluetooth, cellular communication, optical communication, radio frequency communication, wired (e.g., copper), and the like. In some examples, the private communication links may be direct communication links between the development host system 102, the runtime host system 104, the container image repository 106, and the signature repository 108.

The development host system 102 and the runtime host system 104 may be computing devices each including a processor or microcontroller and/or any other electronic component, or a device or system that may facilitate compute and/or data storage for container management. Examples of the development host system 102 and the runtime host system 104 may include, but are not limited to, desktop computers, laptops, smartphones, servers, workstations, storage systems, converged or hyperconverged systems, and the like. In some examples, the development host system 102 and the runtime host system 104 may be implemented as virtualized computing resources such as virtual machines. The development host system 102 and the runtime host system 104 may be configured to host container management applications such as a container management application 112A and a container management application 112B, respectively. The container management applications 112A and 112B may be executed by processing resources of the development host system 102 and the runtime host system 104, respectively. In some example implementations, each of the development host system 102 and the runtime host system 104 may host both the container management applications 112A, 112B.

The container management applications 112A, 112B are applications that facilitate one or more of the creation of a container image (e.g., a container image 116), creation of a container from the container image, management of lifecycle actions of the container, scheduling of the container, migration of the container, and/or any other operation involving containers or container images. The lifecycle actions may include initialization of the container created using the container image, a resume of the container, an update of the container, or combinations thereof. Examples of the container management applications 112A and 112B may include container builds (e.g., container builds from Docker, Podman, Buildah), container orchestrator (e.g., Kubernetes) control plane applications, and container orchestrator member node applications. Examples of the container orchestrator control plane applications that may be used as the container management applications 112A, 112B may include a scheduler (e.g., kube-scheduler) and an application programming interface (API) server (e.g., kube-api-server). Further, the container orchestrator member node applications that may be used as container management applications 112A, 112B may include a network proxy to manage communications with containers (e.g., kube-proxy), a software agent to monitor containers (e.g., kubelet), and a container runtime (e.g., software that is responsible for creating and running containers).

For the purpose of illustration in the disclosure hereinafter, the container management application 112A is described as being a container image-building tool useful to create and manage the storage of container images, for example, a container image. In some examples, a user can create container images using the container management application 112A. Further, once created, the container images may be stored in the container repository 106. Further, for the purpose of illustration in the disclosure hereinafter, the container management application 112B is described as being a container runtime that is used to create containers from the container image and run the containers.

To create and run the containers on the runtime host system 104, the container images may be downloaded on the runtime host system 104 from the container image repository 106. In some examples, the container image repository 106 may be a data store hosted on a network node (not shown) accessible via the network 110. Examples of the network node hosting the container image repository 106 may include desktop computers, laptops, smartphones, servers, workstations, storage systems, converged or hyperconverged systems, and the like. In some examples, the container image repository 106 may be hosted on a public cloud, private cloud, or hybrid cloud. In some other examples, the container image repository 106 may be hosted locally on the development host system 102 and the runtime host system 104. In certain examples, the container image repository 106 may be implemented as a distributed data store where the content of the container images may be physically stored in a plurality of host systems, including the development host system 102 and the runtime host system 104.

In accordance with some examples consistent with the present disclosure, the development host system 102 and the runtime host system 104 may be configured with respective security management systems, such as the security management systems 114A and 114B, to secure the container management applications 112A, 112B, the container images, and/or the containers. In particular, the proposed security management systems 114A and 114B are configured to block any compromised container management applications, container images, containers, and/or executable applications within the containers from further execution. In some examples, the security management systems 114A and 114B may be implemented as software applications, firmware, hardware modules, or combinations thereof. In some examples, the security management systems 114A and 114B may be implemented as virtual computing resources, such as virtual machines, containers, pods, or combinations thereof.

In one example, the security management systems 114A, 114B may be configured to prohibit the execution of the container management applications 112A, 112B if the container management applications 112A, 112B have been compromised. This protects the development host system 102 and/or the runtime host system 104 from creating container images and/or executing any malicious containers. For ease of illustration hereinafter, examples of protecting the container management application 112A via the security management system 114A are described. The security management systems 114B may also be configured to protect the container management application 112B in a similar fashion.

In particular, the security management system 114A may periodically or on request looks for any container management applications hosted on the development host system 102. Upon discovering a container management application (e.g., the container management application 112A in the present implementation of FIG. 1) on the development host system 102, the security management system 114A may generate a container management application digital signature (CMADS) based on the container management application. The CMADS may be a signed cryptographic hash of the container management application 112A, in some examples. During the operation, the security management system 114A may monitor any attempt to run the container management application 112A and verify the container management application 112A using the CMADS upon detecting the attempt to run the container management application 112A. The security management system 114A may allow the container management application 112A to execute if the container management application is successfully verified using the CMADS. If the container management application 112A is found compromised (i.e., if the verification of the container management application 112A fails), the security management system 114A blocks the execution of the container management application. Additional details of securing the container management application 112A are described in conjunction with methods described in FIGS. 5-7.

Figure 2:
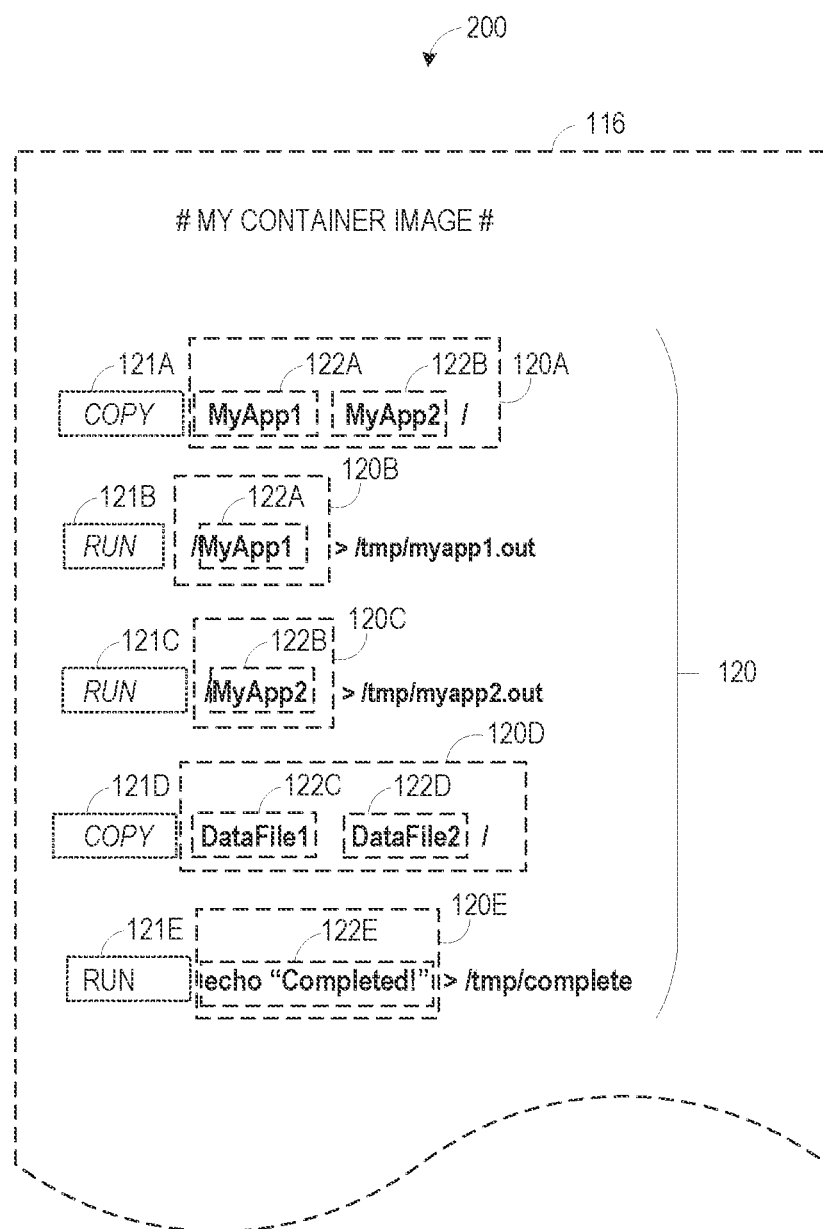
FIG. 2 depicts an example container image.

Further, in some examples, the security management system 114A secures container images, such as the container image 116, to ensure that the use of compromised container images is blocked. An example container image is shown in FIG. 2 (described later). A container image, such as the container image 116, typically includes a plurality of instruction layers, where each of the plurality of instruction layers includes a set of objects (e.g., commands, files, executable applications, data, etc.). To protect the container image 116, the security management system 114A iterates through the instruction layers of the container image and generates instruction layer digital signatures (ILDSs) corresponding to the plurality of instruction layers based on respective sets of objects (see an example method of generating the ILDSs of FIG. 9). Once an ILDS is generated for each of the instruction layers of the container image 116, the security management system 114A may upload the container image 116 to the container image repository 106 and the ILDSs to the signature repository 108. An example method for securing the container image 116 is described in conjunction with FIG. 8.

In some examples, the signature repository 108 may be implemented as a data store hosted on a network node (not shown) accessible via the network 110. Examples of the network node hosting the signature repository 108 may include desktop computers, laptops, smartphones, servers, workstations, storage systems, converged or hyperconverged systems, and the like. In some examples, the signature repository 108 may be hosted on a public cloud, private cloud, or hybrid cloud. In some other examples, the signature repository 108 may be hosted locally on the development host system 102 and the runtime host system 104. In certain examples, the container image repository 106 may be implemented as a distributed data store across a plurality of host systems, including the development host system 102 and the runtime host system 104. An example signature repository is described in conjunction with FIG. 3.

When the container image 116 is downloaded by a user on the runtime host system 104 to create one or more containers, for example, a container 118, the security management system 114B hosted on the runtime host system 104 may trigger verification of the container image 116 to ensure that the container image 116 is not tampered with. The security management system 114B may verify the container image using the ILDSs stored on the signature repository 108. An example method of verifying the container image 116 is described in conjunction with FIG. 10.

Furthermore, in certain examples, the security management system, for example, the security management systems 114A and 114B secures executable applications to ensure that a container (e.g., the container 118) including any compromised executable application is blocked from further execution. In some examples, to enable such security, the security management system 114A may generate an executable application digital signature (EAPPDS) based on a cryptographic hash of the executable application referenced in an instruction layer of the container image 116. In some examples, the EAPPDS may be stored in the signature repository 108 and may be transmitted to the runtime host system 104 to verify the executable application during the execution of the container 118 created using the container image 116.

Referring now to FIG. 2, a syntax 200 of an example container image, for example, the container image 116 is depicted. The container image 116—named "MY CONTAINER IMAGE", as depicted, in FIG. 2, may include one or more instruction layers, for example. For the purpose of illustration, each line in the container image 116 shown in FIG. 2 is referred to as an instruction layer. For example, the container image 116 depicted in FIG. 2 is shown to have five instruction layers 120A, 120B, 120C, 120D, and 120E, hereinafter collectively referenced as instruction layers 120. The layers 120A, 120B, 120C, 120D, and 120E may be respectively formed based on the directives 121A, 121B, 121C, 121D, and 121E (hereinafter collectively referred to as directives 121) provided in an image build file (e.g., docker file). The directives 121 are shown in the container image 116 for illustration purposes, the directives 121 may not be included in the container image 116. The container management application, for example, the container management application 112A, creates the container image 116 based on the execution of the directives in the image build file. The container image 116 is envisioned to have greater or fewer instruction layers than depicted in FIG. 2. Additional instruction layers may be formed before or after any of the instruction layers 120.

Each instruction layer 120 may include a set of objects. The objects may be commands, files (e.g., represented via respective filenames), executable applications (e.g., represented via respective application names), any text, special symbols, operators, or combinations thereof. For example, the instruction layer 120A is shown to include objects 122A and 122B; the instruction layer 120B is shown to include object 122A, the instruction layer 120C is shown to include object 122B; the instruction layer 120D is shown to include objects 122C and 122D, and the instruction layer 120E is shown to include object 122E. By way of example, the objects 122A and 122B are names of executable applications, such as, MyApp1 and MyApp2. It is to be noted that the content/syntax of the container image 116 as depicted in FIG. 2 is for illustration purposes. More particularly, the example content/syntax of the container image 116 is presented to illustrate a construction of the container image 116 including the instruction layers 120 and objects 122A-122E, and not to specifically recite a particular use case or application. Also, the objects 122A-122E are shown for illustration purposes in FIG. 2. Additional objects may be defined using at least a portion of the rest of the information contained in the instruction layers, for example, ">/tmp/myapp1.out" contained in the instruction layer 120B may be defined as an object.

Figure 3:
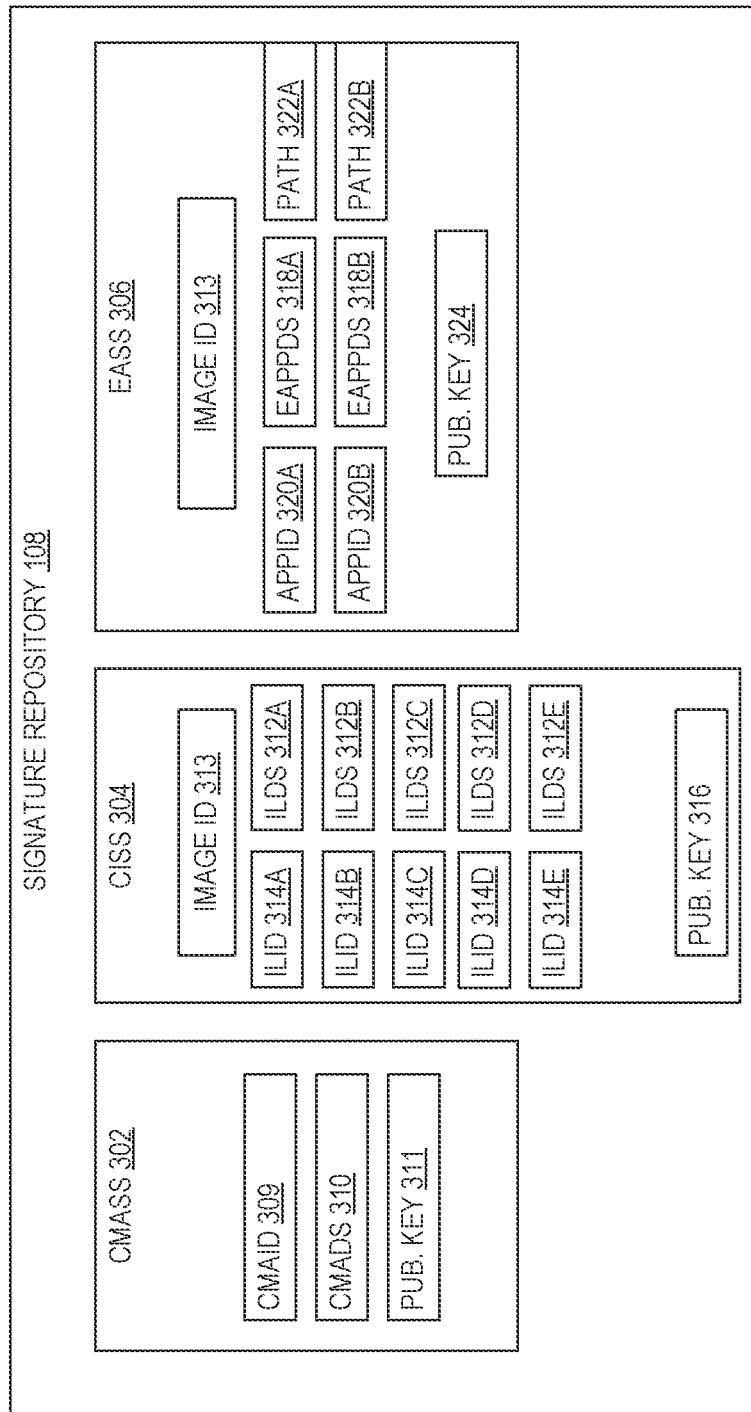
FIG. 3 depicts an example signature repository.

Turning now to FIG. 3, an example signature repository 108 is depicted. The signature repository 108 of FIG. 3 may be an example representative of the signature repository 108 of FIG. 1. In some examples, the signature repository 108 may include one or more signature stores, for example, a container management application signature store (CMASS) 302, a container image signature store (CISS) 304, and/or an executable application signature store (EASS) 306, hereinafter collectively referred to as signature stores. These signature stores 304, 304, and 306 are collections of digital signatures and additional relevant information as will be described hereinafter. The signature stores 304, 304, and 306 may be updated and/or referenced by one or both of the security management systems 114A, 114B to securely manage the container management applications 112A, 112B; container images such as the container image 116, and/or containers such as the container 118. In some examples, signature stores 304, 304, and 306 may represent a logical separation of the content within the signature repository 108.

In particular, the CMASS 302 may include digital signatures of container management applications. For the example implementation of container ecosystem 100, the CMASS 302 may include the CMADS 310 of the container management application 112A. Further, the CMASS 302 may also include an identifier (CMAID) of the container management application, for example, a CMAID 309 of the container management application 112A. The CMAID 309 may be a unique identification value (e.g., application name, serial number, etc.) of the container management application 112A, for example. Also, the CMASS 302 may include a public cryptographic key (PUB. KEY 311) corresponding to a private cryptographic key that the security management system 114A used to create the CMADS. Although not shown, in some examples, a CMADS corresponding to the container management application 112B may also be created by the security management system 114B and stored in the CMASS 302. Example methods of generating the CMADS are described in conjunction with FIGS. 5 and 6.

Further, the CISS 304 may include ILDSs of container images. For the example implementation of container ecosystem 100, the CISS 304 may include the ILDSs corresponding to the instruction layers, such as the instruction layers 120, of the container image 116. For illustration purposes, the CISS 304 is shown to store the instruction layer digital signatures ILDS 312A, ILDS 312B, ILDS 312C, ILDS 312D, and ILDS 312E (hereinafter collectively referred to as ILDSs 312) corresponding to the instruction layers 120A, 120B, 120C, 120D, and 120E, respectively. The instruction layer digital signatures ILDS 312A, ILDS 312B, ILDS 312C, ILDS 312D, and ILDS 312E may be signed values of the cryptographic hashes of the content of the instruction layers 120A, 120B, 120C, 120D, and 120E, respectively. An example method of generating an ILDS is described in conjunction with FIG. 9.

Further, the CISS 304 may also include an identifier (IMAGE ID) 313 of the container image, for example, the container image 116. The IMAGE ID 313 may be a unique identification value (e.g., application name, serial number, etc.) of the container image 116, for example. Moreover, the CISS 304 may also include identifiers of each instruction layer 120 (hereinafter referred to as instruction layer identifiers—ILID) corresponding to the ILDSs. For example, the instruction layer identifiers ILID 314A, ILID 314B, ILID 314C, ILID 314D, and ILID 314E correspond to the instruction layers 120A, 120B, 120C, 120D, and 120E, respectively. Also, the CISS 304 may include a public cryptographic key (PUB. KEY 316) corresponding to a private cryptographic key that the security management system 114A used to create the ILDSs.

The EASS 306 may include digital signatures of the executable applications referenced in a container image, hereinafter referred to as application digital signatures (EAPPDSs)). For the example implementation of container ecosystem 100, the EASS 306 may include the EAPPDS 318A and EAPPDS 318B corresponding to executable applications, such as executable applications "MyApp1" and "MyApp2", respectively, referenced in the container image 116. The application digital signatures such as the EAPPDS 318A and EAPPDS 318B may be signed values of the cryptographic hashes of the content (e.g., program code) of the applications "MyApp1" and "MyApp2", respectively. An example method of generating an EAPPDS is described in conjunction with FIG. 12.

Further, the EASS 306 may also include identifiers (APPIDs), for example, the APPID 320A and APPID 320B of the executable applications "MyApp1" and "MyApp2", respectively. The APP IDs may be unique identification values (e.g., application name, serial number, etc.) of the executable applications. Furthermore, the EASS 306 may also include the container identifier (e.g., IMAGE ID 313) of the container image referencing the executable applications. Moreover, in some examples, the EASS 306 may also include location information, e.g., PATH 322A and PATH 322B, of the executable applications "MyApp1" and "MyApp2". The location information may identify a network storage path where the executable applications are stored. Additionally, the EASS 306 may include a public cryptographic key (PUB. KEY 324) corresponding to a private cryptographic key that the security management system 114A used to create the EAPPDS 318A and EAPPDS 318B.

In some examples, the public cryptographic keys 311, 316, and 324 may be the same. In some examples, the public cryptographic keys 311, 316, and 324 may be different.

Figure 4:
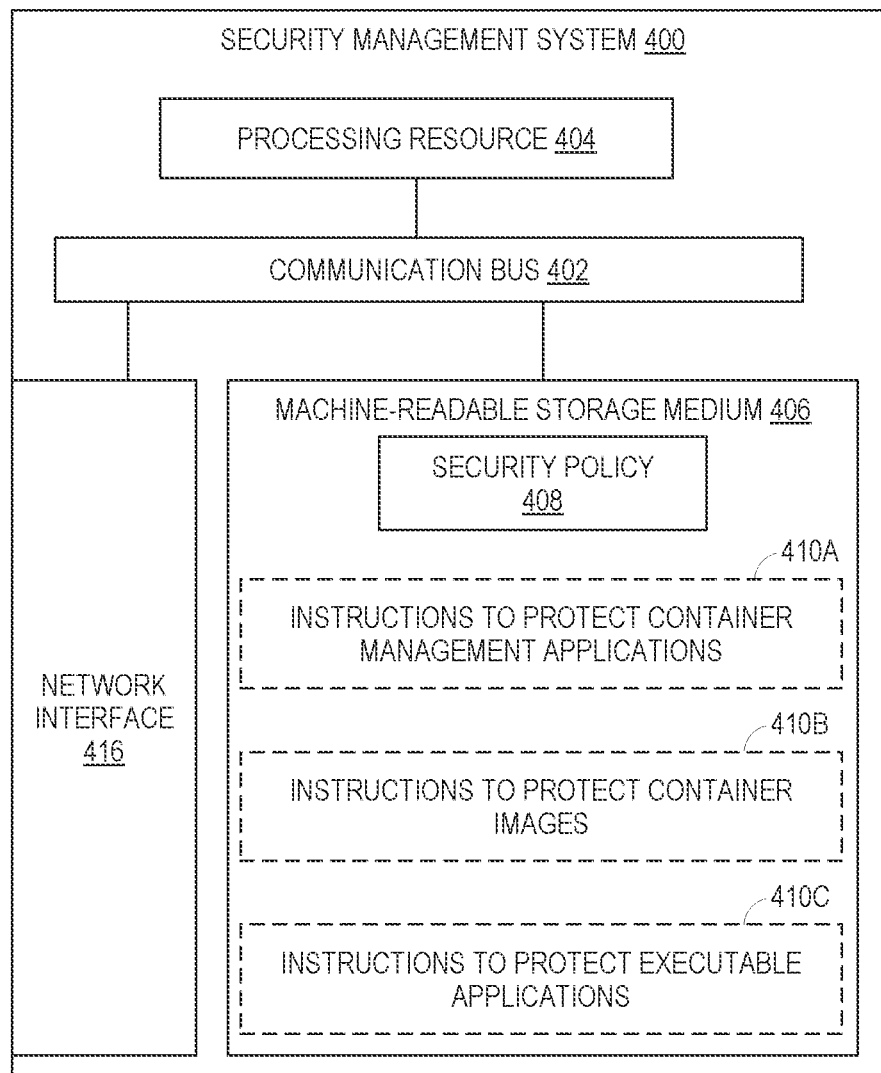
FIG. 4 depicts an example security management system to secure several entities in a container ecosystem.

Turning now to FIG. 4, an example security management system 400 configured to secure several entities in a container ecosystem, for example, the container ecosystem 100, is depicted. The security management system 400 of FIG. 4, may be configured to operate as the security management systems 112A and 112B when deployed in the container ecosystem 100 of FIG. 1 and can perform various operations described in one or more of the earlier drawings and one or more of the method flow diagrams described hereinafter.

The security management system 400 may include a bus 402 or other communication mechanisms for communicating information (e.g., commands and/or data), a hardware processor, also referred to as processing resource 404, and a machine-readable storage medium 406 coupled to the bus 402 for processing information. In some examples, the machine-readable storage medium 406 may be non-transitory and is alternatively referred to as a non-transitory machine-readable storage medium 406. The machine-readable storage medium 406 may be any electronic, magnetic, optical, or any other storage device that may store data and/or executable instructions. Examples of the machine-readable storage medium 406 may include random access memory (RAM), electrically erasable programmable read-only memory (EEPROM), a storage drive, a flash memory, magnetic disk, a compact disc read-only memory (CD-ROM), and the like. The machine-readable storage medium 406 may store data, for example, a security policy 408, and/or one or more program instruction sets 410A, 410B, and 410C.

In some examples, the processing resource 404 may include one or more central processing units (CPUs), semi-conductor-based microprocessors, and/or other hardware devices suitable for retrieval and execution of instructions in the program instruction sets 410A, 410B, and/or 410C stored in a machine-readable storage medium 406. The processing resource 404 may fetch, decode, and execute instructions to protect the container ecosystem 100, for example. As an alternative or in addition to retrieving and executing instructions, the processing resource 404 may include one or more electronic circuits that include electronic components, such as a field-programmable gate array (FPGA), an application-specific integrated circuit (ASIC), or other electronic circuits for performing the functionality of one or more instructions. In some examples, when the security management system 400 is implemented as a virtual resource (e.g., a VM, a container, or a software application), the processing resource 404 and the machine-readable storage medium 406 may respectively represent a processing resource and a machine-readable storage medium of a host system (e.g., the development host system 102 and the runtime host system 104) that hosts the security management system 400 as the virtual resource.

Further, in some examples, the security management system 400 may also include a network interface 416 coupled to bus 402. The network interface 416 provides a two-way data communication coupling to one or more network links that are connected to one or more networks (e.g., the network 110). For example, the network interface 416 may be an integrated services digital network (ISDN) card, cable modem, satellite modem, or a modem to provide a data communication connection to a corresponding type of telephone line. As another example, the network interface 416 may be a local area network (LAN) card or a wireless communication unit (e.g., Wi-Fi chip/module).

The security policy 408 stored in the machine-readable medium 406 may specify whether an entity, for example, container management application, container image, container, and/or executable application needed to be protected. In particular, the security policy 408 may specify, for each entity, whether the entity is needed to be protected via digital signatures and verified during its execution. Table-1 presented below illustrates a configuration of the example security policy 408.

TABLE 1

Example security policy configuration

| Entity | Protection |
| --- | --- |
| Container Management Application 112A | YES |
| Container Management Application 112B | YES |
| Container image 116 | YES |
| Executable application - "MyApp1" | YES |
| Executable application - "MyApp2" | YES |

The example security policy configuration depicted in Table-1 indicates that all of the container management applications 112A, 112B, container image 116, and the executable applications "MyApp1" and "MyApp2" are secured. Although not depicted in Table-1, the security management system 400 may allow an authorized user to update the protection status of the entities. For example, the authorized user may define not to protect the Executable application—"MyApp2" by defining protection status as "NO".

The program instruction sets 410A, 410B, and 410C may include instructions that are executable by the processing resource 404 for performing one or more of the operations described in the methods of FIGS. 5-14. In particular, the instruction set 410A may store instructions that when executed by the processing resource 404 cause the processing resource 404 to protect container management applications, such as the container management application 112A by executing one or more operations described in methods of FIGS. 5, 6, and 7, for example. Further, the instruction set 410B may store instructions that when executed by the processing resource 404 cause the processing resource 404 to protect container images, such as the container image 116 by executing one or more operations described in methods of FIGS. 8, 9, and 10, for example. Furthermore, the instruction set 410C may store instructions that when executed by the processing resource 404 cause the processing resource 404 to protect executable applications, such as executable applications "MyApp1" and "MyApp2" by executing one or more operations described in methods of FIGS. 11, 12, 13, and 14, for example In the description hereinafter, several operations performed by a security management system, such as the security management system 112A or 112B, will be described with help of flow diagrams depicted in FIGS. 5-14. For illustration purposes, the flow diagrams, of FIGS. 5-14, are described in conjunction with the container ecosystem 100 of FIG. 1 and the examples described in FIGS. 2-4, however, the methods of FIGS. 5-14 should not be construed to be limited to the example configuration of the container ecosystem 100 and the examples presented in FIGS. 2-4. The methods of FIGS. 5-14 may include a plurality of method blocks that may be performed by a processor-based system such as, for example, the security management system 400 which is an example representative of the security management system 112A or 112B. In particular, operations at each of the plurality of blocks may be performed by a processing resource such as the processing resource 404 by executing one or more of the instruction sets 410A-410C stored in the machine-readable medium 406. In particular, the methods described in FIGS. 5-14 may represent an example logical flow of some of the several operations performed by the security management system. However, in some other examples, the order of execution of the method blocks of FIGS. 5-14 may be different than the order shown. For example, the operations at various blocks may be performed in series, in parallel, or in a series-parallel combination.

Securing Container Management Applications

In the description hereinafter, example operations for securing container management applications are described in conjunction with methods of FIGS. 5-7. In particular, the methods of FIGS. 5-7 describe how the proposed example security management systems ensure that any compromised security management system container management is blocked from execution thereby protecting the respective host systems from creating and executing any malicious containers.

Figure 5:
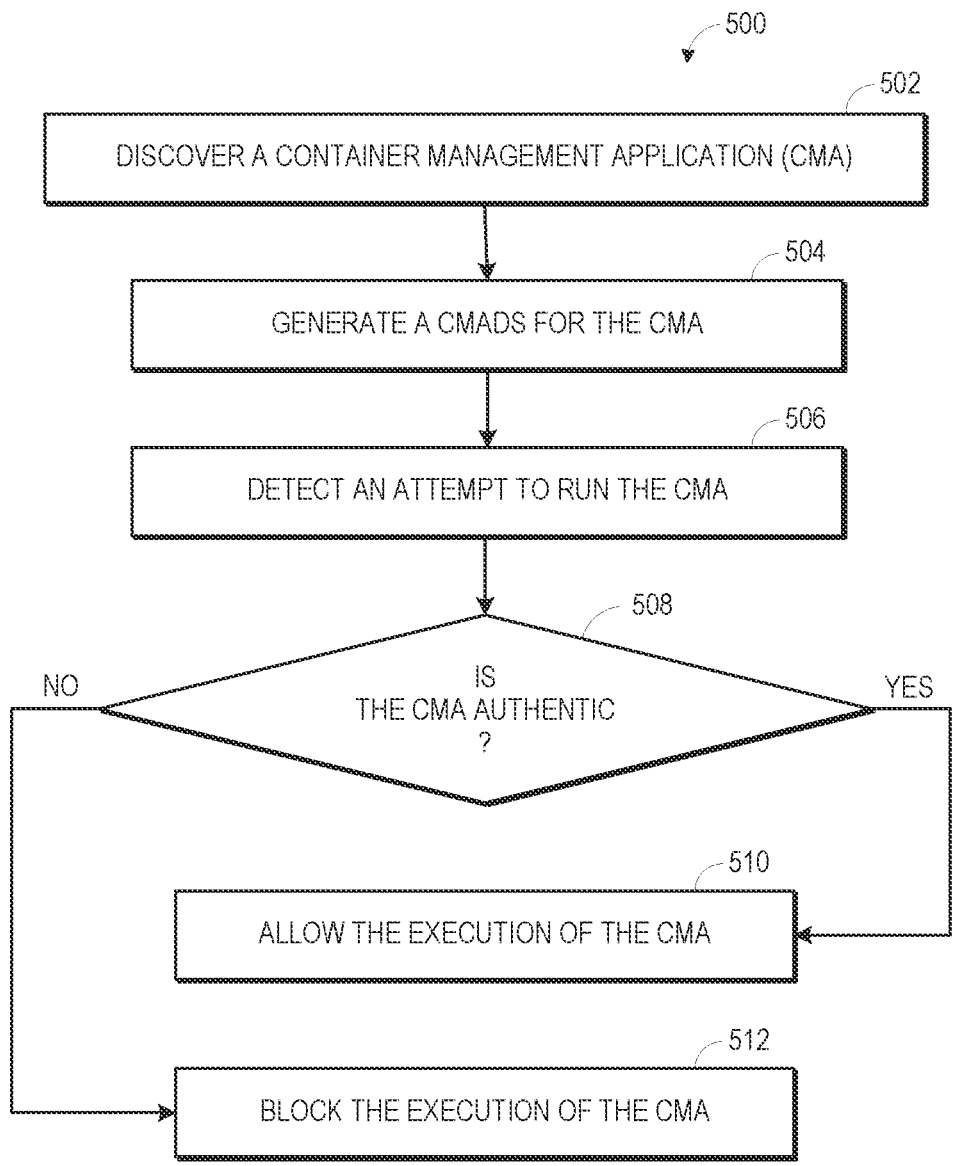
FIG. 5 depicts a flow diagram of an example method for securely executing a container management application.

Referring now to FIG. 5, a flow diagram of an example method 500 for securely executing a container management application, for example, the container management application 112A, is presented. Certain information about the operations performed at one or more blocks of the method 500, which is described in conjunction with FIG. 1, is not repeated herein for the sake of brevity. Although the method 500 is described with reference to the security management system 114A for securely executing the container management application 112A, examples described herein may also be applicable to the security management system 114B for securely executing the container management application 112B.

At block 502, the security management system 114A may discover a container management application on a host system, for example, the development host system 102. The discovery of the container management application may entail scanning the content of the host system to search for specific executable files that relate to container management. In particular, in order to discover container management applications, the security management system 114A may periodically scan files stored in the development host system 102 to identify files having one or more predefined file labels (e.g., metadata tags). The example of the predefined file labels that the security management system 114A may look for may include SELinux label equal to "container_runtime_exec_t" or "kubelet_exec_t". Any file having such predefined file labels may be identified as container management applications. By way of example, at block 502, the security management system 114A may discover the container management application 112A on the development host system 102.

Further, at block 504, the security management system 114A may generate a CMADS based on the container management application 112A, for example. In particular, the security management system 114A may generate cryptographic value based on the content (e.g., program code) of the container management application 112A to create the CMADS (e.g., the CMADS 310, see FIG. 3). Additional details of generating the CMADS are described in conjunction with FIG. 6. In some examples, the security management system 114A may store the CMADS 310 in the signature store 108. In some examples, the security management system 114A may store the CMADS 310 locally on the development host system 102.

During the operation of the development host system 102, the security management system 114A may be configured to allow the container management application 112A to run if the container management application 112A remains uncompromised/genuine. In order to provide such security, the security management system 114A, at block 506, may detect an attempt to run the container management application 112A. Typically, when an application executes on a computing system, it requests hardware resources (e.g., RAM, input-output devices, etc.) for its use via the kernel of an operating system running on the computing system. kernel is a program code that is part of the operating system and it acts as an interface between user applications (e.g., the container management application 112A in this case) and the hardware components of the system (e.g., the development host system 102 in this case). In accordance with the examples presented herein, the security management system 114A may detect an attempt to run the container management application 112A based on any interaction of the container management application 112A with the kernel of the operating system running on the development host system 102.

Upon determining that the attempt to run the container management application 112A has been made, the security management system 114A, at block 508, may perform a check to verify the container management application 112A using the CMADS. Details of verifying the container management application 112A are described in conjunction with FIG. 7. At block 508, if the container management application 112A is successfully verified using the CMADS, the security management system 114A, at block 510, may allow the execution of the container management application 112A on the host management system 102. However, at block 508, if the verification of the container management application 112A fails, the security management system 114A, at block 512, may block the execution of the container management application 112A.

Figure 6:
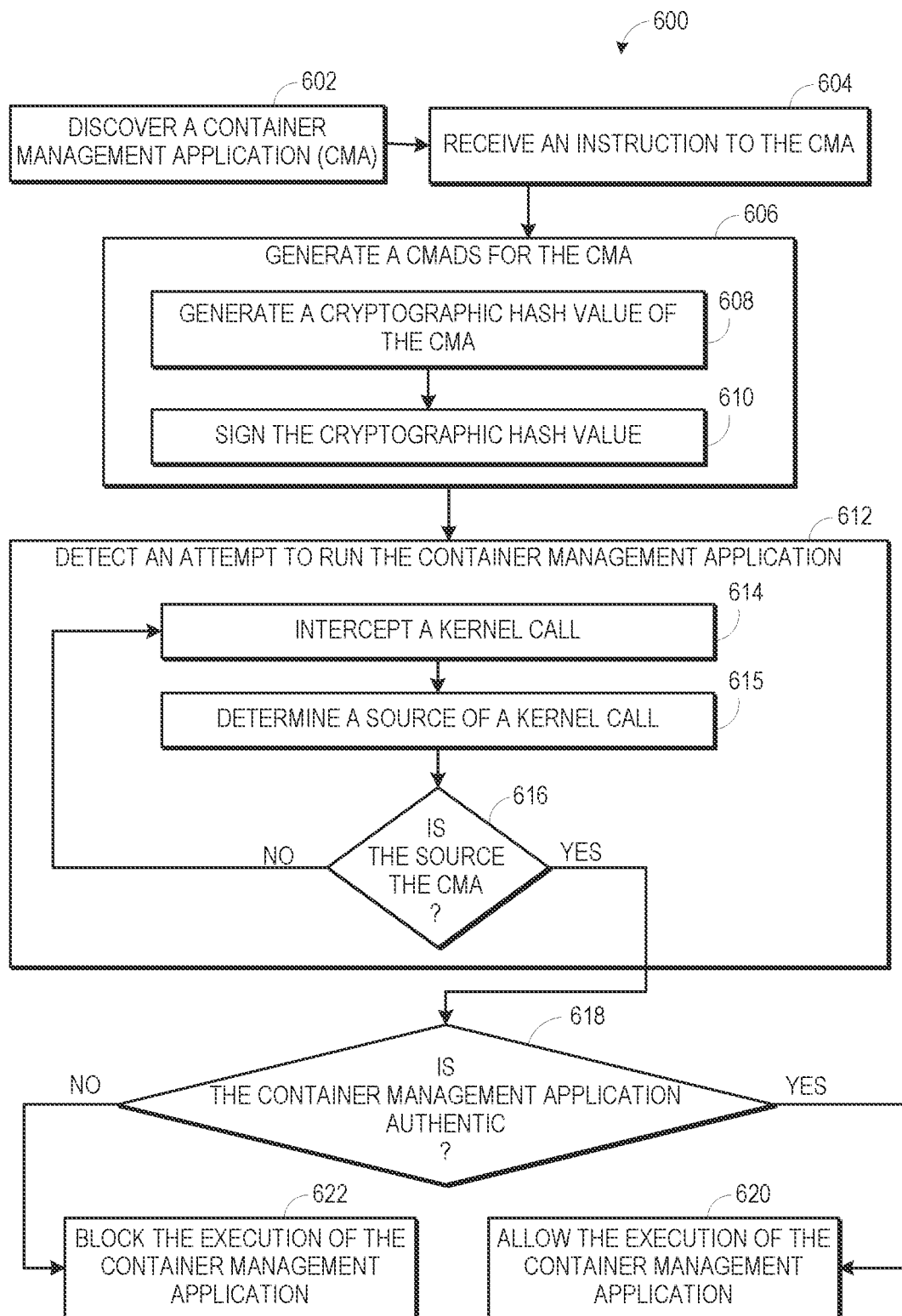
FIG. 6 depicts a flow diagram of another example method for securely executing a container management application.

Referring now to FIG. 6, a flow diagram of another example method 500 for securely executing a container management application, for example, the container management application 112A, is presented. In particular, the method 600 of FIG. 6 is an example representative of the method 500 of FIG. 5 and may include certain additional details and/or additional blocks than described in FIG. 5. Although the method 600 is described with reference to the security management system 114A for securely executing the container management application 112A, examples described herein may also apply to the security management system 114B for securely executing the container management application 112B. Moreover, certain details of the operations performed at one or more blocks in method 600 have already been described the operations in conjunction with earlier drawings, which are not repeated herein for the sake of brevity.

In some examples, at block 604, the security management system 114A may receive an instruction to sign the container management application 112A. For example, a user may issue a sign command via a command line interface (CLI) or a graphical user interface which may instruct the security management system 114A. Command 1 presented below may be an example CLI command that may be used to sign the container management application 112A.

Discover SELinux_label_Container_runtime_exec_t-sign     Command (1)

In response to receiving the instruction to sign the container management application 112A, the security management system 114A, at block 602, may discover a container management application on a host system, for example, the development host system 102. For the example CLI command (1), the security management system 114A may scan files stored in the development host system 102 to identify files that have the SELinux label equal to "container_runtime_exec_t".

Further, at block 606, the security management system 114A may generate a CMADS (e.g., the CMADS 310) of the container management application 112A, for example. In one example, to create the CMADS 310, the security management system 114A, at block 608, may first calculate a cryptographic hash value of the container management application. In particular, the security management system 114A may select an executable file (i.e., the one discovered at block 604) of the container management application 112A and apply a cryptographic hash function to the content of the executable file. For example, the security management system 114A may use cryptographic hash functions such as SHA-1, SHA-2, SHA-3, SHA-256, Whirlpool, BLAKE2, BLAKE3, and/or MD5 to generate the cryptographic hash value. It is to be noted that the examples presented in this disclosure are not limited to the use of any particular cryptographic hash function for performing any cryptographic operation. After applying the cryptographic hash function to any file or set of characters, a string of characters (including, alphabets, numbers, symbols, and/or special characters) may be generated, which is referred to as the cryptographic hash value. Accordingly, by applying the cryptographic hash function to the executable file of the container management application 112A, the cryptographic hash value of the container management application 112A may be generated.

Further, at block 610, the security management system 114A may sign the cryptographic hash value of the container management application 112A using a private cryptographic key to generate a signed cryptographic hash value of the container management application 112A. The private cryptographic key may be the private cryptographic key associated with the development host system 102. The signed cryptographic hash value of the container management application 112A is the CMADS 310.

In some examples, the security management system 114A may reference a security co-processor chip (e.g., trusted platform module (TPM)) (not shown) of the development host system to sign the cryptographic hash value generated at block 608. The security co-processor chip on the development host system 102 may conform to Trusted Computing Group (TCG) specifications. In some examples, the security co-processor chip may include device unique data such as the private cryptographic key which it may use for data encryption and decryption purposes. In some examples, an operating system running via the processing resource of the security management system 112A may ask the security co-processor chip to sign the cryptographic hash value of the container management application 112A to generate the CMADS 310. The security management system 114A may store the CMADS 310 in the signature store 108 and/or locally on the development host system 102.

During the operation of the development host system 102, the security management system 114A may be configured to allow the container management application 112A to run if the container management application 112A remains uncompromised/genuine. In order to provide such security, the security management system 114A, at block 612, may detect an attempt to run the container management application 112A. In order to detect the attempt to run the container management application 112A, the security management system 114A, at block 614, may intercept kernel calls to identify a source of the kernel calls. A kernel call may be a request that a user application (e.g., the container management application 112A) may make to the kernel of the operating system for hardware resources. Further, at block 615, the security management system 114A may determine a source (e.g., an originator) of the kernel call. The source of the kernel call may be is a user application that initiates the kernel call.

For each kernel call, at block 616, the security management system 114A may perform a check to determine if the source of the kernel call is the container management application 112A (i.e., the application discovered at block 604). At block 616, if it is determined that the source of the kernel call is not the container management application 112A, the security management system 114A may determine that the application issuing the kernel call is not the container management application 112A and the control may pass to block 614 again. However, at block 616, if it is determined that the source of the kernel call is the container management application 112A, the security management system 114A may determine that an attempt to run the container management application 112A has been made.

In response to determining that the attempt to run the container management application 112A is made, at block 618, the security management system 114A may perform a check to verify the container management application 112A using the CMADS 310. Details of verifying the container management application 112A are described in conjunction with FIG. 7. At block 618, if the container management application 112A is successfully verified using the CMADS, the security management system 114A, at block 620, may allow the execution of the container management application 112A on the host management system 102. However, at block 618, if the verification of the container management application 112A fails, the security management system 114A, at block 622, may block the execution of the container management application 112A.

Further, in some examples, the security management system 114A and/or 1148 may enable immutability for the container management applications 112A, 1128. Upon activation of the immutability, the security management system may block any modification to the container management applications 112A, 1128. For example, once immutability is activated for the container management application 112A, for example, the security management system 114A may monitor any attempt to edit a source code (e.g., an executable file/.exe file) of the container management application 112A. If such an attempt to edit the source code of the container management application 112A is detected, the security management system 114A may block such an attempt and the container management application 112A is protected from any tampering. Accordingly, the security management systems 112A, 1128 may not only detect and block the execution of the compromised container management applications 112A, 1128 but also prevents modifications to the container management applications 112A, 1128 if the immutability is enabled.

Figure 7:
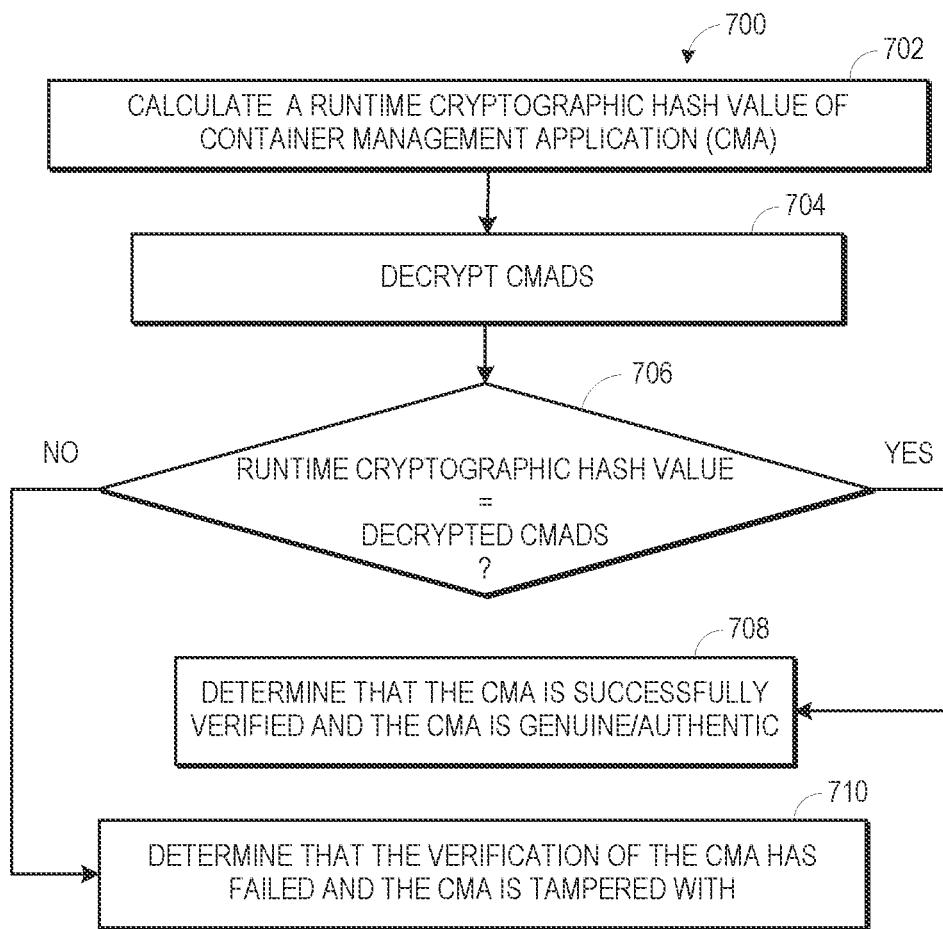
FIG. 7 depicts a flow diagram of an example method for verifying an authenticity of a container management application.

Turning now to FIG. 7, an example method 700 for verifying the container management application 112A is presented. In particular, the method 700 represents several operations performed at block 618 in the method 600.

At block 702, the security management system 114A may calculate a runtime cryptographic hash value of the container management application 112A. The runtime cryptographic hash value may be calculated in a similar fashion as calculating the cryptographic hash value at block 608 of FIG. 6 based on an instantaneous content of the container management application 112A.

Further, at block 704, the security management system 114A may decrypt the CMADS (e.g., the CMADS 310) using a public cryptographic key, for example, the public cryptographic key 311, associated with the private cryptographic key to generate a decrypted signature. In an example where the CMADS 310 and the public cryptographic key 311 are not stored locally on the development host system 102, the security management system 114A may download the CMADS 310 and the public cryptographic key 311 from the signature repository (e.g., the signature repository 108). Further, at block 706, the security management system 114A may perform a check to determine whether the runtime cryptographic hash value (calculated at block 702) matches with the decrypted CMADS (determined at block 704).

At block 706, if it is determined that the runtime cryptographic hash value matches with the decrypted signature, the security management system 114A, at block 708, determines that the container management application 112A is successfully verified and hence, the container management application 112A is genuine/authentic. However, at block 706, if it is determined that the runtime cryptographic hash value does not match with the decrypted signature, the security management system 114A, at block 710, determines that the verification of the container management application has failed and hence, the container management application 112A could be tampered with.

Securing Container Images

In the description hereinafter, example operations for securing container images are described in conjunction with methods of FIGS. 8-10. For ease of illustration, the methods of FIGS. 8-10 will be described in conjunction with FIGS. 1-4. In particular, the methods of FIGS. 8-10 describe how a container image is secured and the use of any compromised container image is blocked thereby protecting the respective runtime host systems from creating and executing any malicious containers.

Figure 8:
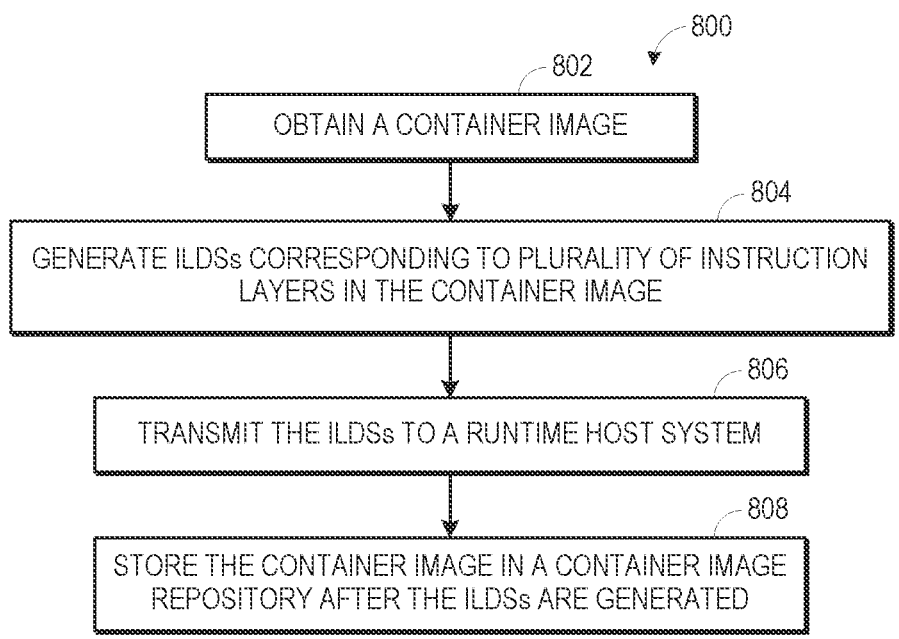
FIG. 8 depicts a flow diagram of an example method for securing a container image.

Referring now to FIG. 8, a flow diagram of an example method 800 for securing a container image, for example, the container image 116, is presented. At block 802, the security management system 114A may obtain the container image 116. In one example, the security management system 114A may retrieve the container image 116 from local storage on the development host system 102. The container image 116 might have been created on the development host system 102 via the container management system 112A or have been downloaded from an external source. As previously noted, the container image 116 may include a plurality of instruction layers (e.g., the instruction layers 120, see FIG. 2). The instruction layers 120 may include a set of objects, for example, the objects 122A-122E.

Further, at block 804, the security management system 114A may generate ILDSs (e.g., the ILDSs 312A-312E) corresponding to the plurality of instruction layers (e.g., instruction layers 120) based on respective sets of objects. In particular, to generate an ILDS for a given instruction layer, the security management system 114A may perform cryptographic operations on the respective objects and sign the result of the cryptographic operations. Details of generating the ILDSs are described in conjunction with FIG. 9.

After the ILDSs are created, the security management system 114A, at block 806, may transmit the ILDSs 312A-312E to a runtime host system, for example, the runtime host system 104, In some examples, to transmit the ILDSs, the security management system 114A may store the ILDSs 312A-312E in the signature repository 108 (see FIG. 3). In an example, the ILDSs 312A-312E may be stored in the signature repository 108 along with a container image identifier (e.g., image identifier 313), identifiers of respective instruction layers (e.g., the ILIDs 314A-314E), and a public cryptographic key (e.g., the public cryptographic key 316) corresponding to the private cryptographic key that is used to create the ILDSs 312A-312E.

Further, in some examples, at block 808, the security management system 114A may store the container image 116 in the container image repository 106 after the ILDSs are generated. Therefore, any tampering with the container images in duration between the ILDSs are generated and the container images are uploaded to the container image repository 106 can also be detected, and the use of such tampered container images may be blocked.

Further, in some examples, on a download request from the container management system 1128 of the runtime host system 104, the ILDSs 312A-312E may be transmitted to the runtime host system 104 from the signature repository 108. Once downloaded by the runtime host system 104, the ILDSs may be used by the security management system 1148 on the runtime host system 104 to verify the container image during any life-cycle action of one or both of the container image 116 or a container (the container 118) created using the container image 116. Details about verifying a container image are described in conjunction with FIG. 10.

Figure 9:
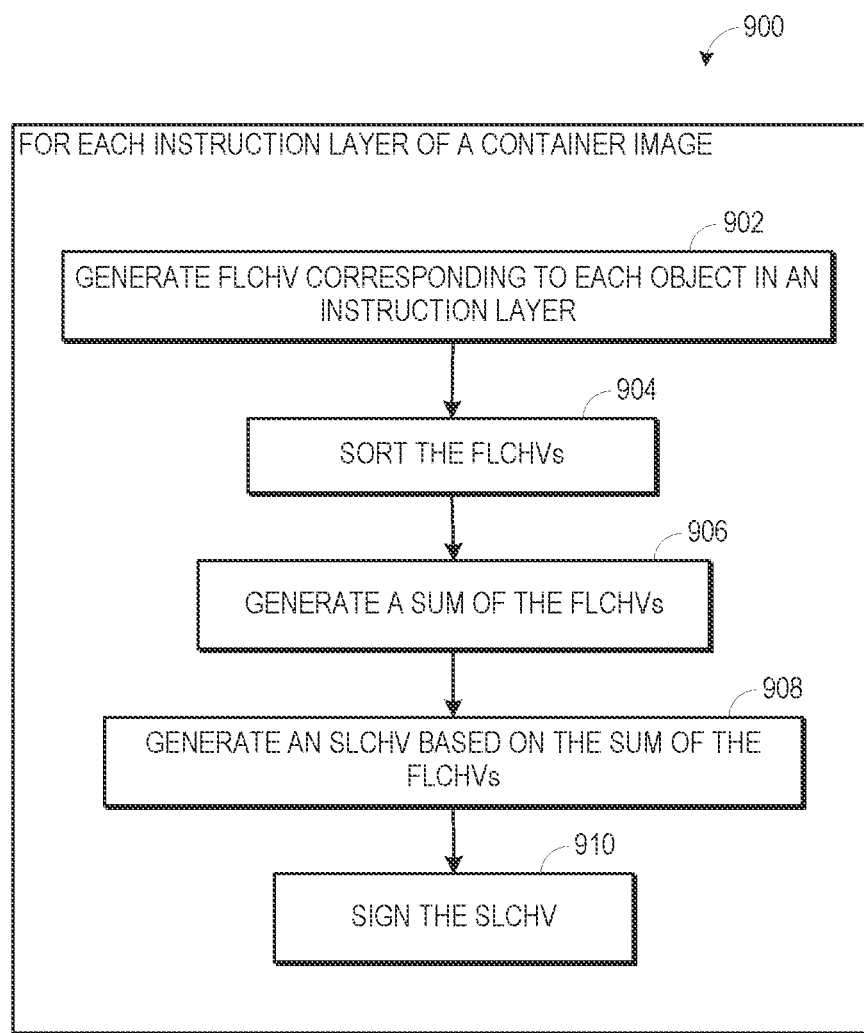
FIG. 9 depicts a flow diagram of an example method for generating instruction layer digital signatures for a container image.

Turning now to FIG. 9, a flow diagram of an example method 900 for generating ILDSs (e.g., the ILDS 312A) for a container image (e.g., the container image 116) is presented. In particular, the method 900 describes several sub-steps of the method block 804 of FIG. 8. For illustration purposes, the method 900 is described with reference to the ILDS 312A of the instruction layer 120A. The method 900 of FIG. 9 may be performed for each of the instruction layers 120 if the container image 116.

In particular, at block 902, for a given instruction layer (e.g., the instruction layer 120A), the security management system 112A may generate a first-level cryptographic hash value (FLCHV) corresponding to each object in the respective set of objects (e.g., the objects 122A and 122B). The security management system 112A may determine the FLCHVs by applying a cryptographic hash function to the objects 122A and 122B of the instruction layer 120A. For example, the security management system 114A may use cryptographic hash functions such as SHA-1, SHA-2, SHA-3, SHA-256, Whirlpool, BLAKE2, BLAKE3, and/or MD5 to generate the FLCHVs. After applying the cryptographic hash function to an object of the instruction layer, a string of characters (including, alphabets, numbers, symbols, and/or special characters) may be generated, which is referred to as the FLCHV of the object. Equations 1 and 2 presented below represent example first-level values of the objects 122A and 122B.

$$FLCHV1=CHF(MyApp1) \quad \text{Equation (1)}$$

$$FLCHV2=CHF(MyApp2) \quad \text{Equation (2)}$$

where, FLCHV1 and FLCHV2 respectively represent FLCHVs of the objects 122A and 122B, and CHF( ) is a cryptographic hash function.

Further, in some examples, at block 904, the security management system 112A may sort the FLCHVs in order, for example, ascending order or descending order. In some examples, the sorting of the FLCHVs may be optional and the security management system 112A may perform execute block 906 directly after the execution of block 902. At block 906, the security management system 112A may generate a sum (ΣFLCHV) of the first-level cryptographic hash values after the sorting. An example sum of the FLCHVs for the instruction layer 120A may be determined using Equation (3).

$$\Sigma(FLCHV\_120A)=FLCHV1+FLCHV2 \quad \text{Equation (3)}$$

Furthermore, at block 908, the security management system 112A may generate a second-level cryptographic hash value (SLCHV) for the instruction layer 120A based on the sum of the FLCHVs. The security management system 112A may apply a cryptographic hash function to the sum of the FLCHVs of the instruction layer to generate the SLCHV for the instruction layer. In one example, the cryptographic hash function used at the block 908 may be the same as the cryptographic hash function used at block 902. In another example, the cryptographic hash function used at the block 908 may be different from the cryptographic hash function used at the block 902. An example SLCHV for the instruction layer 120A may be determined using Equation (4).

$$SLCHV\_120A=CHF(\Sigma(FLCHV\_120A)) \quad \text{Equation (4)}$$

Moreover, at block 910, the security management system 112A may sign the SLCHV using the private cryptographic key. In some examples, the security management system 114A may reference the security co-processor chip (e.g., TPM) of the development host system 102 to sign the SLCHV using the private cryptographic key. The signed value of the SLCHV may be referred to as the ILDS. For example, the signed value of the SLCHV of the instruction layer 120A may be the ILDS 312A.

Likewise, by executing the method 900 for each of the rest of the instruction layers, the security management system 112A may generate the ILDS 312B, ILDS 312C, ILDS 312D, and ILDS 312E.

Figure 10:
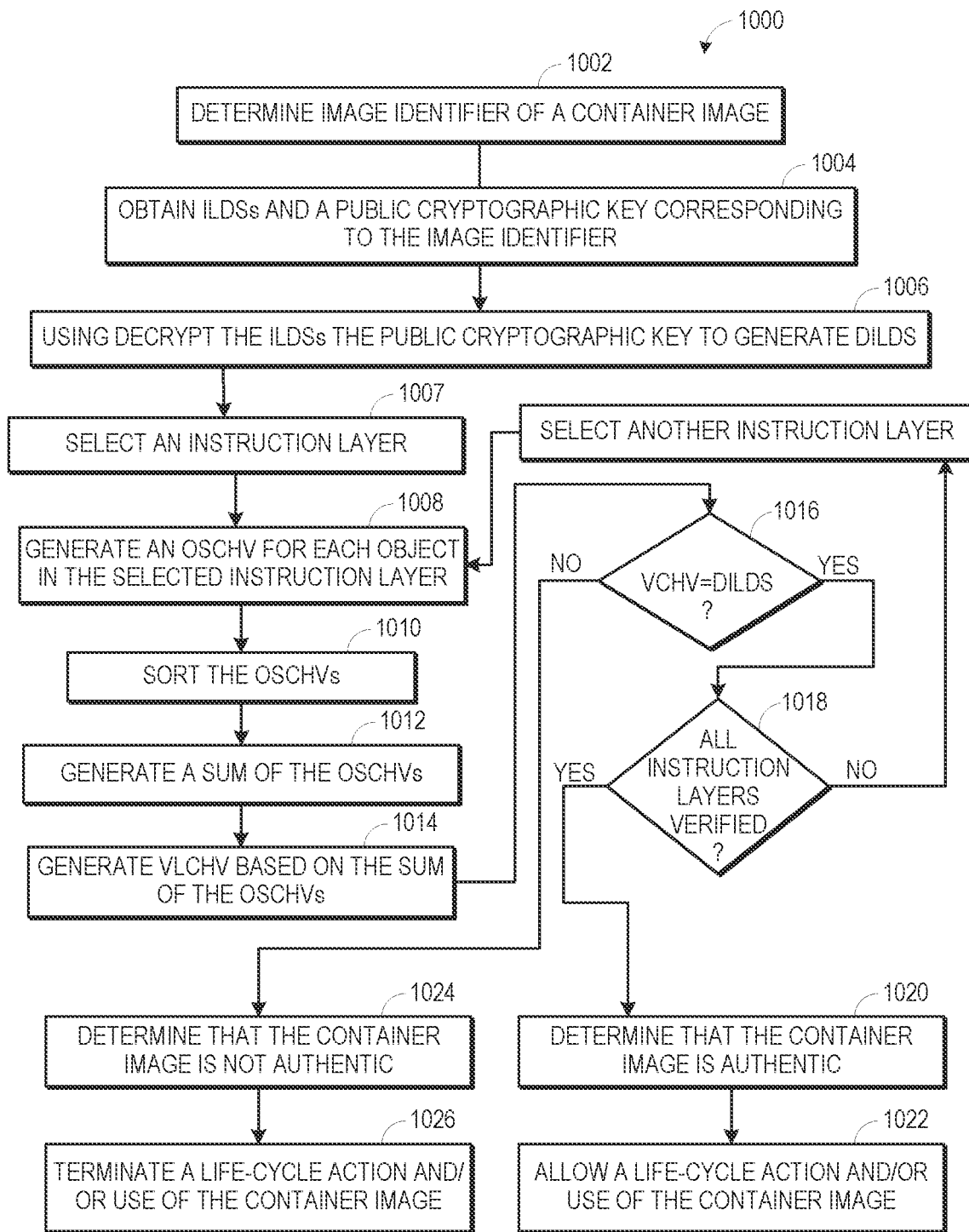
FIG. 10 depicts a flow diagram of an example method for verifying a container image.

Turning now to FIG. 10, an example method for verifying a container image, for example, the container image 116, is presented. During the operation of the container ecosystem 100 of FIG. 1, the container image 116 may be downloaded on the runtime host system 104 to create and deploy containers using the container image 116. The proposed example verification of the container image 116 on the runtime host system 104 may aid in blocking the use of the container image 116 in case the container image 116 is found compromised or tampered with. In particular, the security management system 1148 hosted on the runtime host system 104 may verify the container image 116 by executing the method 1000 of FIG. 10. In some examples, the security management system 114A may also be configured to perform verification of the container image 116 for any use of the container image 116 on the development host system 102. For the purpose of illustration, the method 1000 is described as performed by the security management system 1148.

At block 1002, the security management system 1148 may determine the image identifier of the container image received at the runtime host system 104. The image identifier may be listed as metadata of the container image 116. Accordingly, the security management system 1148 may analyze the metadata of the container image 116 to determine based on the metadata associated with the container image 116. Further, at block 1004, the security management system 1148 may obtain the ILDSs and the public cryptographic key corresponding to the image identifier from the signature repository 108. For example, for the container image 116, the security management system 114B may obtain the ILDSs 312A-312E and the public cryptographic key 316 corresponding to the image identifier 313 from the signature repository 108. Further, at block 1006, the security management system 114B may decrypt the ILDSs using the public cryptographic key 316 to generate decrypted ILDS (DILDS) corresponding to each of the ILDSs.

Further, the security management system 114B may verify the ILDS corresponding to each of the instruction layers of the downloaded container image 116. For example, at block 1007, the security management system 114B may select an instruction layer of the container image. For a selected instruction layer in the container image, at block 1008, the security management system 114B may generate an object-specific cryptographic hash value (OSCHV) corresponding to each object in the selected instruction layer of the container image downloaded at the runtime host system 104. The OSCHVs, at block 1008, may be determined in a similar fashion as described with respect to generating the FLCHVs at block 902 of FIG. 9. The OSCHVs may be cryptographic hash values calculated based on the instantaneous content of the container image 116 downloaded at the runtime host system 104. As will be understood, in case the container image is tampered with or compromised, the OSCHVs may differ from the corresponding FLCHVs. Example OSCHVs of the objects 122A and 1228 of the downloaded container image 116 may be represented as OSCHV1 and OSCHV2, respectively.

Furthermore, at block 1010, the security management system 114B may sort the OSCHVs in order. In particular, the OSCHVs may be sorted in the same order in which the FLCHVs were sorted at block 904 of FIG. 9. If the FLCHVs were not sorted in the method 900 (i.e., block 904 was not executed), the block 1010 may be omitted from the method 1000. Further, at block 1012, the security management system 114B may generate a sum of the OSCHVs of the selected instruction layer. An example sum of the OSCHVs for the instruction layer 120A may be determined using Equation (5).

$$\Sigma(OSCHV\_120A)=OSCHV1+OSCHV2 \quad \text{Equation (5)}$$

After the sum of the OSCHVs is calculated, the security management system 1148, at block 1014, may generate a verification cryptographic hash value (VCHV) based on the sum of OSCHVs. An example SLCHV for the instruction layer 120A may be determined using Equation (6).

$$VCHV\_120A=CHF\ MOSCHV\_120B)) \quad \text{Equation (6)}$$

At block 1016, the security management system 114B may perform a check to determine whether the VCHV of the selected instruction layer matches with the respective DILDS determined at block 1006 by comparing the VCHV with the respective DILDS. For example, for the instruction layer 120A, the security management system 1148 may compare the VCHV_120A with the corresponding DILDS (i.e., the decrypted value of the ILDS 3128) to determine if the VCHV_120A is same as the corresponding DILDS. At block 1016, if it is determined that the VCHV of the selected instruction layer matches with the respective DILDS, the security management system 114B, at block 1018, may perform another check to determine if all the instruction layers have been verified. If there are remaining instruction layers to be verified ("NO" at block 1018), the security management system 114B, at block 1018, may select one of the remaining instruction layers for verification and the control may move to block 1008 again. However, at block 1018, if it is determined that all of the instruction layers of the downloaded container image are verified ("YES" at block 1018), the security management system 114B, at block 1020, may determine that the container image downloaded at the runtime host system 104 is authentic/genuine. Accordingly, at block 1022, the security management system 114B may allow the life-cycle action and/or the use of the downloaded container image 116 to advance.

Returning now to block 1014, if it is determined that the VCHV of the given instruction layer does not match with the respective DILDS, the security management system 114B, at block 1024, may determine that the container image downloaded at the runtime host system 104 is not authentic/genuine. Accordingly, at block 1026, the security management system 114B may terminate the life-cycle action and/or the use of the downloaded container image 116.

As will be appreciated, the security management system 114A protects the container images at the level of instruction layers. In particular, the ILDSs 312A-312E of the container image 116 are stored in the signature repository 108 along with respective ILIDs 314A-314E. Accordingly, not only the compromised container images are blocked from use but also tampered instruction layers may be identified. This may help in easier and faster debugging of the compromised container images.

Securing Executable Applications

In the description hereinafter, example operations for securing container images are described in conjunction with methods of FIGS. 11-13. For ease of illustration, the methods of FIGS. 11-13 will be described in conjunction with FIGS. 1-4. In particular, the methods of FIGS. 11-13 describe how a container including any compromised executable application is blocked from further execution. An objective of verifying the executable applications in addition to the container images (described above) is to effectively detect and block tampered executable applications from execution.

Figure 11:
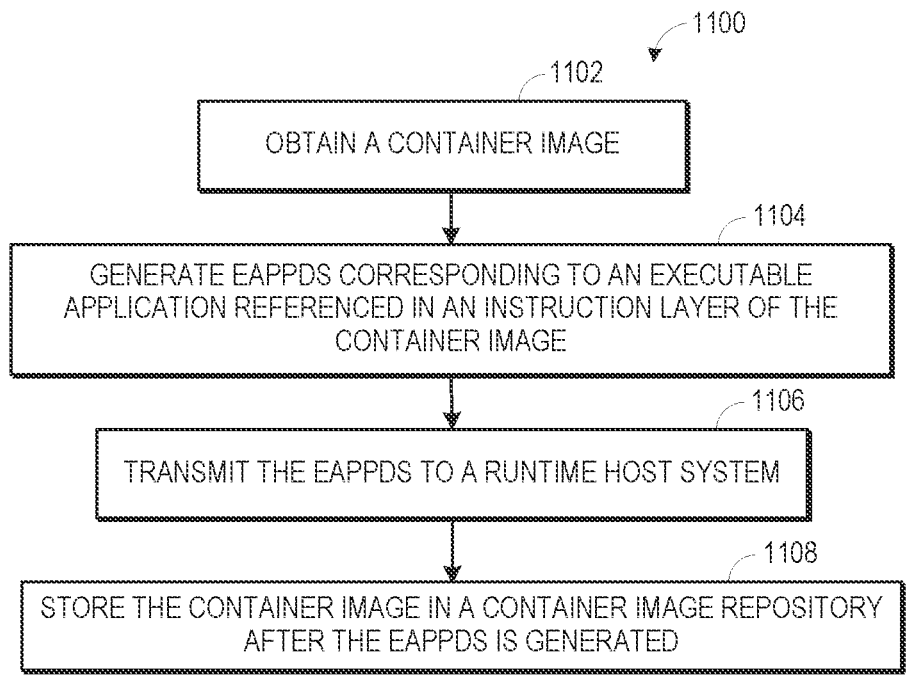
FIG. 11 depicts a flow diagram of an example method for securing an executable application in a container image.

Referring now to FIG. 11, a flow diagram of an example method 1100 for securing an executable application in a container image, for example, the container image 116, is presented.

At block 1102, the security management system 114A may obtain the container image 116. The security management system 114A may retrieve the container image 116 from local storage on the development host system 102. As previously noted, the container image 116 may include a plurality of instruction layers (e.g., the instruction layers 120, see FIG. 2, one or more of which may reference one or more executable applications. For example, the instruction layer 120A, 120B, and 120C of the container image 116 reference executable applications "MyApp1" and "MyApp2" as depicted in FIG. 2. For illustration purposes, the method 1100 is described with reference to securing the executable application "MyApp1" referenced in the instruction layer 120A of the container image 116. A similar process may be applicable for securing the executable application "MyApp2" referenced in the instruction layer 120A.

At block 1104, the security management system 114A may generate an EAPPDS based on a cryptographic hash of the executable application. For example, to generate the EAPPDS 318A corresponding to the executable application "MyApp1", the security management system 114A may apply a cryptographic hash function to the executable application "MyApp1." Likewise, the security management system 114A may also generate the EAPPDS 318B corresponding to the executable application "MyApp2". Additional details of generating the EAPPDSs 318A and 318B are described in conjunction with FIG. 12.

After the EAPPDSs 318A and 318B are generated, the security management system 114A, at block 1106, may transmit the EAPPDSs 318A and 3188 to a runtime host system, for example, the runtime host system 104, In some examples, to transmit the EAPPDSs 318A and 318B, the security management system 114A may store the EAPPDSs 318A and 318B in the signature repository 108 (see FIG. 3). In an example, the EAPPDSs 318A and 318B may be stored in the signature repository 108 along with respective container image identifier (e.g., image identifier 313), storage paths (e.g., path 322A and 322B), and the public cryptographic key (e.g., the public cryptographic key 324) corresponding to a private cryptographic key that is used to create the EAPPDSs 318A and 318B.

Further, at block 1108, the security management system 114A may store the container image 116 in the container image repository 106 after the EAPPDSs 318A and 318B are generated.

Figure 12:
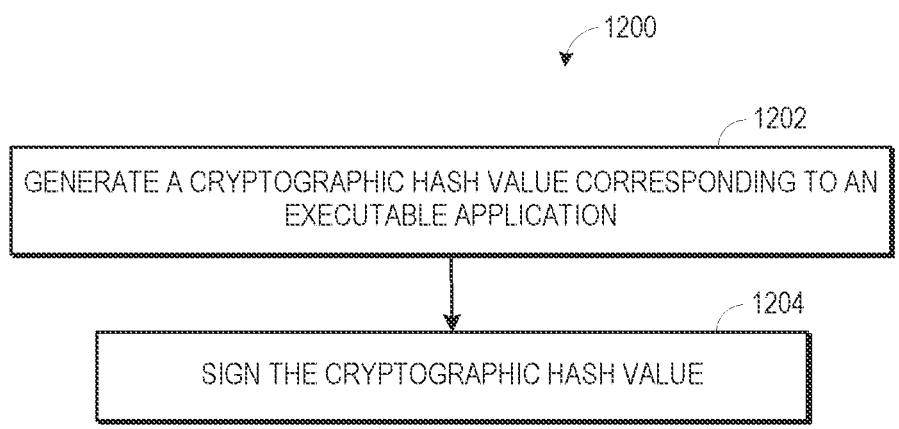
FIG. 12 depicts a flow diagram of another example method for generating an executable application digital signature for an executable application referenced in a container image.

Referring now to FIG. 12, a flow diagram of an example method 1200 for generating an EAPPDS, for example, an EAPPDS 318A, is presented. For illustration purposes, the method 1100 is described with reference to the executable application "MyApp1" referenced in the instruction layer 120A of the container image 116 (see FIG. 2). In particular, the method 1200 of FIG. 12 describes a plurality of operations performed at block 1104 of FIG. 11. The method 1200 may be performed for each of the executable applications for which the security policy (see Table-1) requires protection.

At block 1202, the security management system 114A application may generate a cryptographic hash value corresponding to the executable application. In particular, the security management system 114A may select the executable application (i.e., .exe file of the executable application) and apply a cryptographic hash function to the selected executable application. For example, the security management system 114A may use cryptographic hash functions such as SHA-1, SHA-2, SHA-3, SHA-256, Whirlpool, BLAKE2, BLAKE3, and/or MD5 to generate the cryptographic hash value. After applying the cryptographic hash function to the executable application, a set of characters, a string of characters (including, alphabets, numbers, symbols, and/or special characters) may be generated, which is referred to as the cryptographic hash value of the executable application. Accordingly, by applying the cryptographic hash function to the executable application "MyApp1", the cryptographic hash value of the executable application "MyApp1" may be generated.

Further, at block 1204, the security management system 114A may sign the cryptographic hash value of the executable application using the private cryptographic key to generate a signed cryptographic hash value of the executable application. The private cryptographic key may be the private cryptographic key associated with the development host system 102. The signed cryptographic hash value of the executable application "MyApp1" is the EAPPDS 318A. The security management system 114A may reference the security co-processor chip of the development host system 102 to sign the cryptographic hash value generated at block 1204.

Figure 13:
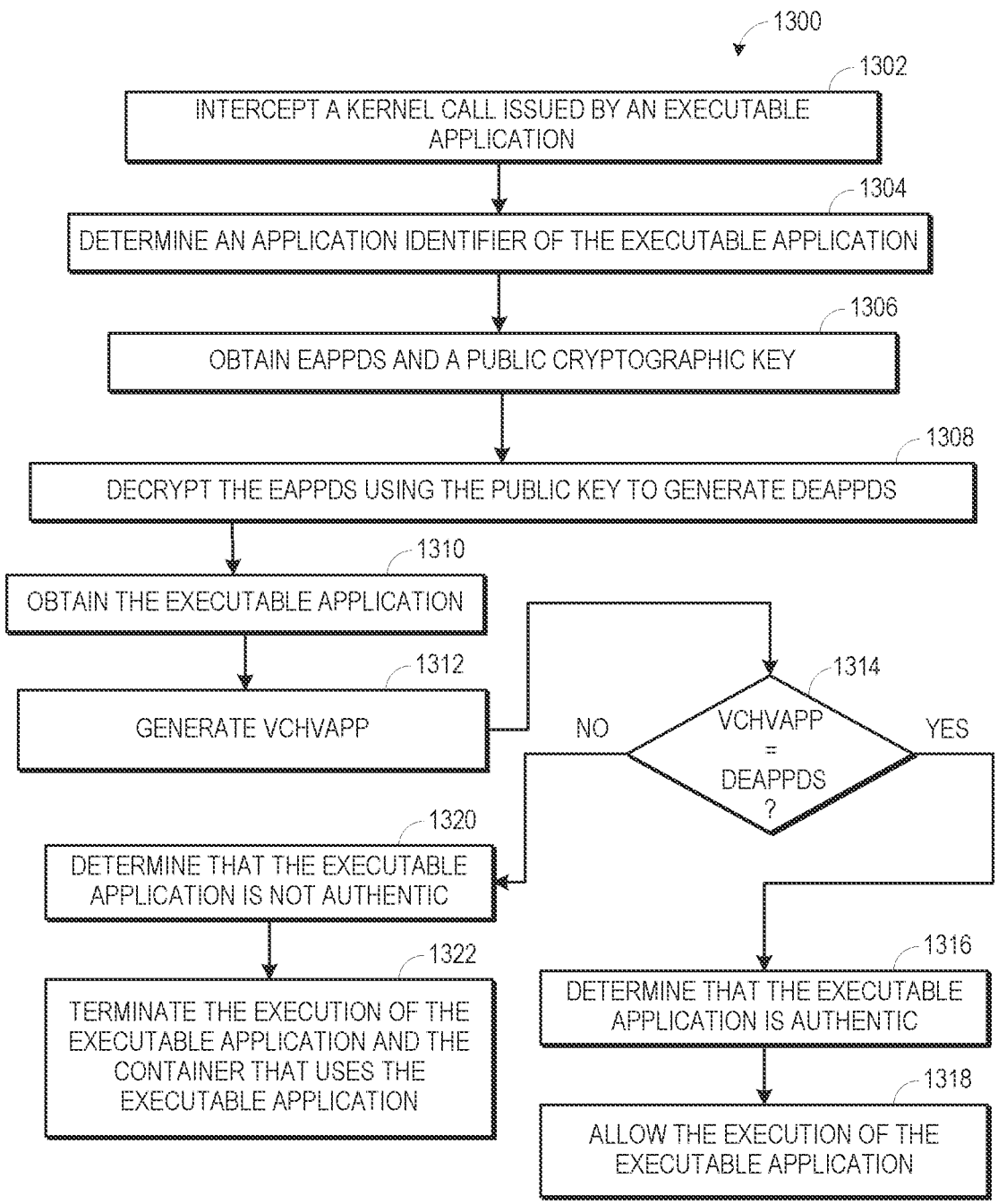
FIG. 13 depicts a flow diagram of an example method for verifying an executable application in a container image.

Turning now to FIG. 13, an example method 1300 for verifying an executable application is presented. For illustration purposes, the method 1300 is described with reference to the verification of the executable application "MyApp1". The method 1300 may be performed for each of the executable applications for which the security policy (see Table-1) requires protection.

During the operation of the container ecosystem 100 of FIG. 1, the container management system 112B hosted on the runtime host system 104 may create and or run one or more containers created using the container image 116, for example. It might happen that the executable applications referenced in the container image 116 may have been tampered with. By executing the method 1300, the security management system 114B may determine if the application is tampered with and block the execution of any such compromised applications. Therefore, the workloads running via such container and the runtime host system can be safeguarded. In particular, the security management system 114B may verify executable applications in the container, for example, the container 118, by executing the method 1300. The method 1300 may be performed at the time of creating the container 118 and/or before performing any lifecycle operation for the container 118.

As previously noted, when an application executes on a computing system, it requests hardware resources (e.g., RAM, input-output devices, etc.) for its use via the kernel of an operating system running on the computing system. For example, when the container 118 attempts to run the executable application (e.g., MyApp1), the executable application may issue a kernel call. In accordance with the examples presented herein, the security management system 114B, at block 1302, may intercept the kernel calls, including the kernel call issued by the executable application. Further, at block 1304, the security management system 1148 may determine an application identifier of the executable application based on the kernel call. In particular, for the kernel call issued by the executable application "MyApp1," the security management system 1148 may determine that the APPID is APPID 320A based on the source data in the kernel call. Further, at block 1306, the security management system 1148 may obtain the EAPPDS and the public cryptographic key corresponding to the executable application based on the application identifier. For example, for the APPID 320A, the security management system 114B may obtain the EAPPDS 318A and the public cryptographic key 314 by performing a look-up in the signature repository 108, wherein the private key corresponding to the public cryptographic key 314 was used to create the EAPPDS 318A.

In the description hereinafter, a method of determining whether the executable application is genuine or tampered with is described with help of blocks 1308, 1310, 1312, and 1314. In particular, at block 1308, the security management system 114B may decrypt the EAPPDS (e.g., the EAPPDS 318A) using the public cryptographic key 324 to generate decrypted executable application digital signature (DE-APPDS) corresponding to the executable application "MyApp1."

Further, at block 1310, the security management system 114B may obtain the executable application. In particular, the security management system 1148 may identify the storage path of the executable application by performing a search using the APPID in the signature repository 108. For example, the path 322A may be identified for the APPID 320A. The security management system 114B may retrieve the executable application "MyApp1" from the path 322A.

Furthermore, at block 1312, the security management system 114B may generate a verification cryptographic hash value corresponding to the executable application (VCHVAPP). In particular, to generate the VCHVAPP, the security management system 1148 may apply a cryptographic hash function to the retrieved executable application. For example, the security management system 1148 may use cryptographic hash functions such as SHA-1, SHA-2, SHA-3, SHA-256, Whirlpool, BLAKE2, BLAKE3, and/or MD5 to generate the VCHVAPP. After applying the cryptographic hash function to the retrieved executable application, a set of characters, a string of characters (including, alphabets, numbers, symbols, and/or special characters) may be generated, which is referred to as the VCHVAPP of the executable application. Accordingly, by applying the cryptographic hash function to the executable application "MyApp1", VCHVAPP_MyApp1 of the executable application "MyApp1" may be generated.

Furthermore, at block 1314, the security management system 114B may perform a check to determine whether the VCHVAPP of the given executable application matches with the respective DEAPPDS determined at block 1308 by comparing the VCHVAPP with the respective DEAPPDS. For example, for the executable application "MyApp1", the security management system 114B may compare VCHVAPP_MyApp1 with the corresponding DEAPPDS (i.e., the decrypted value of the EAPPDS 318A) to determine if VCHVAPP_MyApp1 is same as the corresponding DEAPPDS.

At block 1314, if it is determined that the VCHVAPP of the executable application matches with the respective DEAPPDS, the security management system 114B, at block 1316, may determine that the executable application is authentic. Further, at block 1318, the security management system 114B may allow the execution of the executable application. However, at block 1314, if it is determined that the VCHVAPP of the executable application does not match with the respective DEAPPDS, the security management system 114B, at block 1320, may determine that the executable application has been compromised or not authentic. Further, at block 1322, the security management system 114B may terminate the execution of the executable application and the container 118 containing the executable application. For example, for the executable application "MyApp1," depending on the match between the CHVAPP_MyApp1 is the corresponding DEAPPDS, the security management system 114B may either allow or terminate the execution of the executable application "MyApp1" and the container 118. In particular, if any of the executable applications referenced in the container 118/container image 116 is identified as compromised, the security management system 114B may terminate the execution of the container 118.

In some instances, during the operation of the container, for example, the container 118, the container management application 1128 may dynamically (e.g., while the container 118 is running) create one or more additional instruction layers in the container 118 responsive to any changes made to the executable application after the container 118 has been created. Such additional layer included in the container 118 is hereinafter referred to as a read-write (R/W) layer, and the executable application updated after the container 118 has been created is referred to as a runtime executable application. The runtime executable application may be referenced in the R/W layer as a new separate executable application. In the description hereinafter, example operations for securing the runtime executable application are described in conjunction with FIG. 14.

Figure 14:
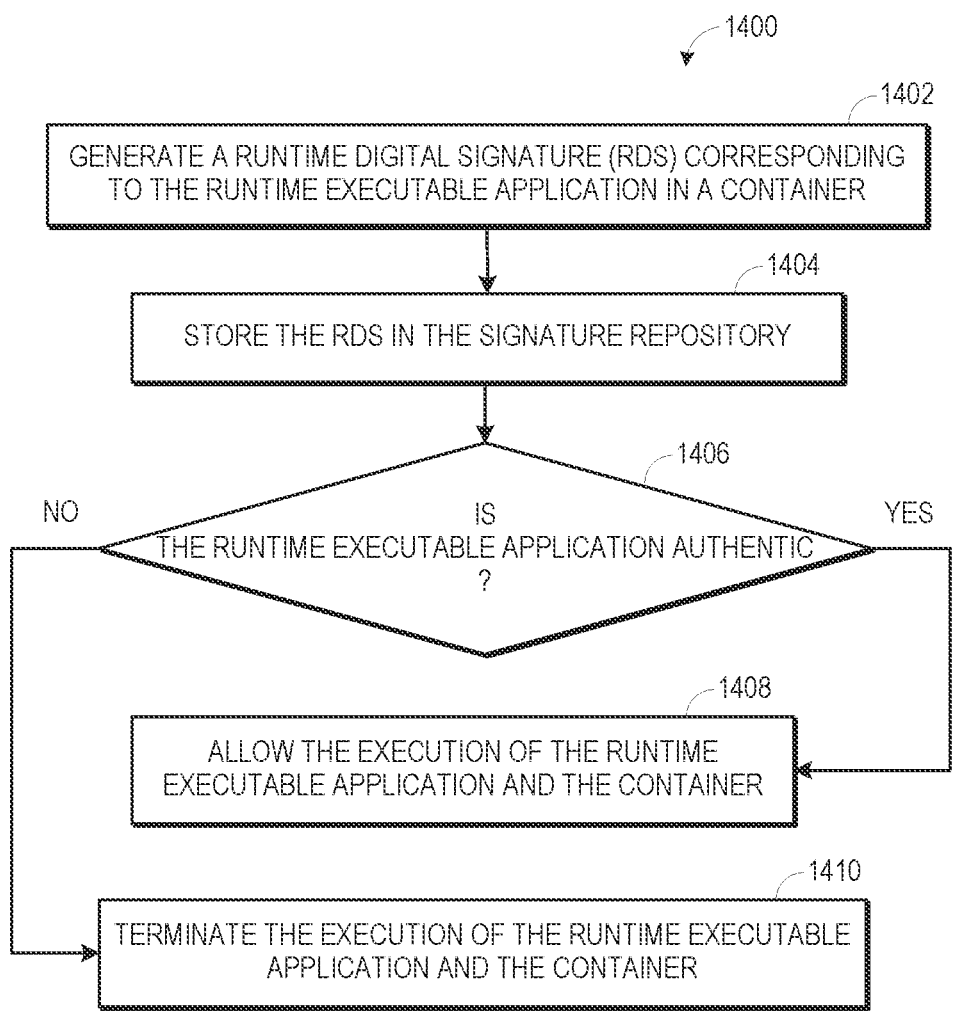
FIG. 14 depicts a flow diagram of an example method for securing a runtime executable application referenced in a read-write layer of the container.

Referring now to FIG. 14, a flow diagram of an example method 1400 for securing the runtime executable application referenced in the R/W layer of the container 118 is presented. In some examples, after the R/W layer with the runtime executable application is created, at block 1402, the security management system 1148 may generate a runtime digital signature (RDS) corresponding to the runtime executable application referenced in the R/W layer. To generate the RDS of the runtime executable application, the security management system 1148 may perform an example method similar to the method 1200 of FIG. 12. For example, the security management system 1148 may generate a cryptographic hash value corresponding to the runtime executable application by applying a cryptographic hash function. Then, the security management system 114B may sign (e.g., via a security co-processor of the runtime host system 104) the cryptographic hash value of the runtime executable application using the private cryptographic key to generate a signed cryptographic hash value of the executable application. The signed cryptographic hash value of the runtime executable application is the RDS. Once generated, the security management system 1148, at block 1404, may store the RDS in the signature repository 108 or locally on the runtime host system 104.

Further, when the runtime executable application is executed, at block 1406, the security management system 114B may perform a check to verify the runtime executable application using the RDS. In some examples, the security management system 114B may perform operations described in FIG. 13 with respect to verification of the executable application. At block 1406, if the runtime executable application is successfully verified ("YES" at block 1406), the security management system 114B, at block 1408, may allow the execution of the runtime executable application and the container 118. However, at block 1406, if the verification of the runtime executable application fails ("NO" at block 1406), the security management system 114B, at block 1410, may terminate the execution of the runtime executable application and the container 118. In particular, if any of the runtime executable applications referenced in the container 118 is identified as compromised (i.e., with failed verification at block 1406), the security management system 1146 may terminate the execution of the container 118.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. The term "based on" means based at least in part on.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   obtaining a container image comprising a reference to an executable application in an instruction layer of the container image;
   generating an executable application digital signature based on a cryptographic hash of the executable application; and
   transmitting the executable application digital signature to a runtime host system to verify an authenticity of the executable application during execution of a container created using the container image on the runtime host system.

2. The method of claim 1, further comprising storing the container image in a container image repository after the executable application digital signature is generated.

3. The method of claim 1, wherein generating the executable application digital signature comprises:
   generating a cryptographic hash value corresponding to the executable application; and
   signing the cryptographic hash value using a private cryptographic key.

4. The method of claim 3, further comprising storing the executable application digital signature in a signature repository along with one or more of a container image identifier, a storage path of the executable application, a public cryptographic key corresponding to the private cryptographic key, an application identifier of the executable application.

5. The method of claim 4, wherein the signature repository is accessible to the runtime host system, and wherein transmitting the executable application digital signature comprises transmitting the executable application digital signature from the signature repository to the runtime host system.

6. The method of claim 5, further comprising wherein verifying the authenticity of the executable application, wherein verifying the authenticity of the executable application further comprises:
   intercepting a kernel call issued from the executable application;
   determining the application identifier of the executable application based on the kernel call;
   obtaining, from the signature repository, the executable application digital signature and the public cryptographic key corresponding to the executable application based on the application identifier; and
   decrypting the executable application digital signature using the public cryptographic key to generate a decrypted executable application digital signature.

7. The method of claim 6, wherein verifying the authenticity of the executable application further comprises:
   obtaining the executable application from the storage path;
   generating a verification cryptographic hash value corresponding to the executable application; and
   comparing the verification cryptographic hash value with respective decrypted executable application digital signature.

8. The method of claim 7, further comprising:
   determining whether the executable application is authentic if the verification cryptographic hash value matches with the decrypted executable application digital signature;
   allow execution of the container in response to determining that the executable application is authentic; and
   terminating execution of the container in response to determining that the executable application is not authentic.

9. The method of claim 1, wherein the container comprises a read-write layer that is dynamically created during the execution of the container, wherein the method further comprises:
   generating a runtime digital signature corresponding to a runtime executable application associated with the read-write layer of the container; and
   storing the runtime digital signature on a signature repository along with a container identifier of the container created using the container image.

10. The method of claim 9, further comprising verifying authenticity of the runtime executable application using the runtime digital signature.

11. A security management system, comprising:
    a machine-readable storage medium storing executable instructions;
    a processing resource coupled to the machine-readable storage medium, wherein the processing resource is configured to execute one or more of the instructions to:
    obtain a container image comprising a reference to an executable application in an instruction layer of the container image;
    generate an executable application digital signature based on a cryptographic hash of the executable application; and
    transmit the executable application digital signature to a runtime host system to verify an authenticity of the executable application during execution of a container created using the container image on the runtime host system.

12. The security management system of claim 11, wherein the processing resource is configured to execute one or more of the instructions to store the container image in a container image repository after the executable application digital signature is generated.

13. The security management system of claim 11, wherein to generate the executable application digital signature, the processing resource is configured to execute one or more of the instructions to:

generating a cryptographic hash value corresponding to the executable application; and signing the cryptographic hash value using a private cryptographic key.

14. The security management system of claim 13, wherein the processing resource is configured to execute one or more of the instructions to store the executable application digital signature in a signature repository along with one or more of a container image identifier, a storage path of the executable application, a public cryptographic key corresponding to the private cryptographic key, an application identifier of the executable application.

15. The security management system of claim 14, wherein the signature repository is accessible to the runtime host system, and wherein the executable application digital signature is transmitted from the signature repository to the runtime host system.

* * * * *